(12) United States Patent
Takano et al.

(10) Patent No.: US 11,660,785 B2
(45) Date of Patent: May 30, 2023

(54) METHOD FOR MANUFACTURING FIBER-REINFORCED PLASTIC

(71) Applicant: Mitsubishi Chemical Corporation, Chiyoda-ku (JP)

(72) Inventors: Tsuneo Takano, Tokyo (JP); Takashi Honma, Tokyo (JP); Satoshi Kaji, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 792 days.

(21) Appl. No.: 16/504,459

(22) Filed: Jul. 8, 2019

(65) Prior Publication Data
US 2019/0329460 A1 Oct. 31, 2019

Related U.S. Application Data

(63) Continuation of application No. PCT/JP2018/000778, filed on Jan. 15, 2018.

(30) Foreign Application Priority Data

Jan. 18, 2017 (JP) .............................. JP2017-006767
Mar. 22, 2017 (JP) .............................. JP2017-056123

(51) Int. Cl.
*B29C 43/34* (2006.01)
*B32B 27/18* (2006.01)
(Continued)

(52) U.S. Cl.
CPC ............ *B29C 33/308* (2013.01); *B29C 43/34* (2013.01); *B29C 70/16* (2013.01); *B29C 70/46* (2013.01);
(Continued)

(58) Field of Classification Search
CPC ................................ B29C 70/16; B29C 43/34
See application file for complete search history.

(56) References Cited

U.S. PATENT DOCUMENTS

| 4,720,255 A | 1/1988 | Mittelstadt | |
| 5,595,795 A * | 1/1997 | Alfred | ................. B29C 66/8322 |
| | | | 428/113 |

(Continued)

FOREIGN PATENT DOCUMENTS

| AT | 91960 T | 8/1993 |
| CN | 101910493 A | 12/2010 |

(Continued)

OTHER PUBLICATIONS

Combined Chinese Office Action and Search Report dated Sep. 27, 2020 in Patent Application No. 201880006478.1 (with English machine translation), 27 pages.

(Continued)

*Primary Examiner* — Emmanuel S Luk
(74) *Attorney, Agent, or Firm* — Oblon, McClelland, Maier & Neustadt, L.L.P.

(57) ABSTRACT

A method for producing a fiber reinforced plastic can suppress with which wrinkling or bridging in a convex surface or a concave surface having a large curvature at the same time even if the fiber reinforced plastic has a complicated three-dimensional shape. Such methods for producing a fiber reinforced plastic may involve shaping a prepreg sheet in which continuous fibers are impregnated with a resin material into a three-dimensional shape to produce a fiber reinforced plastic (a); wherein at least a portion of the continuous fibers in an area (X) of the prepreg sheet corresponding to an area (X') in which the fiber reinforced plastic (a) is shear-deformed is bent in an in-plane direction in advance.

12 Claims, 13 Drawing Sheets

(51) Int. Cl.
  *B32B 27/14* (2006.01)
  *B29C 70/16* (2006.01)
  *B29C 33/30* (2006.01)
  *B29C 70/46* (2006.01)

(52) U.S. Cl.
  CPC .............. *B32B 27/14* (2013.01); *B32B 27/18* (2013.01); *B32B 2262/106* (2013.01)

(56) References Cited

U.S. PATENT DOCUMENTS

| | | | | |
|---|---|---|---|---|
| 9,017,507 | B1* | 4/2015 | Ehlers | B29C 70/30 156/256 |
| 2010/0170746 | A1* | 7/2010 | Restuccia | B32B 5/26 181/290 |
| 2010/0285265 | A1 | 11/2010 | Shinoda et al. | |
| 2012/0076973 | A1 | 3/2012 | Guzman et al. | |
| 2013/0269159 | A1* | 10/2013 | Robitaille | B29B 11/16 28/143 |
| 2014/0288893 | A1* | 9/2014 | Blom | G06F 30/00 703/1 |
| 2015/0209982 | A1 | 7/2015 | Kutsuwada et al. | |
| 2016/0354983 | A1 | 12/2016 | Kakimoto et al. | |
| 2018/0169901 | A1* | 6/2018 | Sato | B29C 43/34 |
| 2019/0048500 | A1* | 2/2019 | Tierney | C08J 5/24 |
| 2019/0077048 | A1* | 3/2019 | Fujita | B29C 70/06 |
| 2019/0232528 | A1* | 8/2019 | Tsuda | B29B 11/16 |
| 2019/0299500 | A1* | 10/2019 | Gurney | F01D 25/005 |
| 2019/0389185 | A1* | 12/2019 | Hashimoto | B29C 43/34 |

FOREIGN PATENT DOCUMENTS

| | | |
|---|---|---|
| CN | 104602887 A | 5/2015 |
| CN | 106232314 A | 12/2016 |
| DE | 102010026466 A1 | 1/2012 |
| EP | 0 395 036 A2 | 10/1990 |
| GB | 2492594 A | 1/2013 |
| JP | 58-193117 | 11/1983 |
| JP | 59-01 4926 | 1/1984 |
| JP | 2014-051077 | 3/2014 |
| JP | 2014-073580 | 4/2014 |
| JP | 2015-147311 A | 8/2015 |
| JP | 2015-148021 | 8/2015 |
| JP | 2015-189150 | 11/2015 |
| JP | 2016-043507 | 4/2016 |
| WO | WO 03/024688 A1 | 3/2003 |
| WO | WO 2014/157013 A1 | 10/2014 |
| WO | WO 2016/147646 A1 | 9/2016 |
| WO | WO 2016/208450 A1 | 12/2016 |

OTHER PUBLICATIONS

Extended European Search Report dated Dec. 10, 2019 in Patent Application No. 18741719.1, 6 pages.
International Search Report dated Feb. 27, 2018 in PCT/JP2018/000778 filed Jan. 15, 2018 (with English Translation).
Office Action dated Oct. 16, 2018, in Japanese Patent Application No. 2018-507741 (with English-language translation).
European Office Action dated Feb. 22, 2021 in European Patent Application No. 18 741 719.1, 5 pages.
Combined Chinese Office Action and Search Report dated Jun. 28, 2022 in Patent Application No. 202110148509.0 (with English machine translation), 28 pages.
Extended European Search Report dated May 27, 2022 in European Patent Application No. 22157217.5, 9 pages.
Office Action dated Dec. 1, 2022, in corresponding Chinese Patent Application No. 202110148509.0 (with English-language Translation).
Office Action dated Mar. 2, 2023, in Chinese Patent Application No. 202110148509.0 (with English-language Translation).

* cited by examiner

METHOD FOR MANUFACTURING FIBER-REINFORCED PLASTIC

CROSS-REFERENCE TO RELATED APPLICATIONS

The present application is a continuation application of International Application No. PCT/JP2018/000778, filed Jan. 15, 2018, which claims priority to Japanese Patent Application No. 2017-006767, filed Jan. 18, 2017 and Japanese Patent Application No. 2017-056123, filed Mar. 22, 2017. The contents of these applications are incorporated herein by reference in their entirety.

BACKGROUND OF THE INVENTION

Field of the Invention

The present invention relates to a method for producing a fiber reinforced plastic having a three-dimensional shape.

Priority is claimed on Japanese Patent Application No. 2017-006767, filed Jan. 18, 2017, and Japanese Patent Application No. 2017-056123, filed Mar. 22, 2017, the contents of which are incorporated herein by reference.

Description of the Related Art

A fiber reinforced plastic having a three-dimensional shape is produced by, for example, a method of shaping a prepreg in which a reinforcing fiber base material is impregnated with a resin material into a three-dimensional shape; a method of shaping a reinforcing fiber base material into a three-dimensional shape to obtain a three-dimensional preform, and impregnating the preform with a resin material, followed by solidification (resin transfer molding (RTM) method) or the like.

When the shape of a fiber reinforced plastic (including a preformed product before being processed into a final molded article) obtained by shaping a prepreg into a three-dimensional shape or a preform obtained by shaping a reinforcing fiber base material into a three-dimensional shape is a shape having a moderate convex surface or concave surface with a small curvature, the prepreg and the reinforcing fiber base material can be directly shaped by a press mold. On the other hand, when the shape of the fiber reinforced plastic or preform is a shape having a strongly curved convex surface or concave surface with a large curvature, if the prepreg or the reinforcing fiber base material is directly shaped by a press mold, wrinkling and bridging are likely to occur in the convex surface or concave surface with a large curvature.

As methods of suppressing the occurrence of wrinkling in the fiber reinforced plastic and preform, for example, the following methods have been proposed.

(1) A method of obtaining a preformed product by shaping with a press mold while holding the edge of a prepreg with a clamp or the like and applying tension outward with respect to the prepreg (Patent Documents 1 to 3).

(2) A method of obtaining a preform by applying tensile load to a reinforcing fiber base material by holding and pulling the end of the reinforcing fiber base material with a jig to perform shear deformation in advance, and then shaping the shear-deformed reinforcing fiber base material with a press mold (Patent Document 4).

CITATION LIST

Patent Documents

[Patent Document 1] Japanese Unexamined Patent Application, First Publication No. 2014-051077
[Patent Document 2] Japanese Unexamined Patent Application, First Publication No. 2014-073580
[Patent Document 3] Japanese Unexamined Patent Application, First Publication No. 2016-043507
[Patent Document 4] Japanese Unexamined Patent Application, First Publication No. 2015-148021

BRIEF SUMMARY OF THE INVENTION

Technical Problem

When shaping a prepreg or reinforcing fiber base material into a shape having a convex surface or concave surface with a large curvature, since the amount of deformation of the prepreg or reinforcing fiber base material will be large in the convex surface or concave surface, the prepreg or reinforcing fiber base material needs to be greatly shear-deformed. However, since the prepreg and the reinforcing fiber base material are less susceptible to shear deformation, it is difficult for them to follow the convex surface or concave surface of the press mold with a large curvature. For example, in the case of an L-shaped corner channel (FIG. 5), in an outer corner portion, wrinkling occurs when the prepreg or reinforcing fiber base material cannot follow the convex surface of the outer corner portion of the press mold, and in an inner corner portion, bridging occurs when the prepreg or reinforcing fiber base material cannot follow the concave surface of the inner corner portion of the press mold.

Accordingly, in the method (1), by applying tension outward with respect to the prepreg, the prepreg is made to be in a state of being easily shear-deformed in the direction in which the tension is applied, making it easy for the prepreg to follow the convex surface or concave surface of a press mold with a large curvature when shaping is performed using the press mold. Further, in the method (2), the shear deformation in a direction (orthogonal direction) opposite to the direction of the shear deformation in the molded product is performed in advance on the reinforcing fiber base material, and the shear deformation of the reinforcing fiber base material is alleviated in the convex surface or concave surface with a large curvature when shaping with a press mold to suppress the occurrence of wrinkling.

However, in both methods (1) and (2), since tension is applied outward with respect to the prepreg and the reinforcing fiber base material while holding the edge of the prepreg and the reinforcing fiber base material, there is a restriction in the direction of applying tension to the prepreg and the reinforcing fiber base material. For example, in the case of an L-shaped corner channel (FIG. 5), the direction of shear deformation is a direction (vertical direction) orthogonal to the bending direction in the outer corner portion (FIGS. 6 and 8), and the direction of shear deformation is the bending direction (lateral direction) in the inner corner portion (FIGS. 7 and 9). In this case, in the prepreg or the reinforcing fiber base material, the direction in which the tension is applied in the portion corresponding to the outer corner portion is orthogonal to that in the portion corresponding to the inner corner portion. However, in the method (1) or (2) in which the tension is applied outward with respect to the prepreg or the reinforcing fiber base material while holding the edge of the prepreg or the reinforcing fiber base material, it is difficult to simultaneously apply tensions in directions that are orthogonal to each other to different parts of the prepreg or the reinforcing fiber base material (the portion corresponding to the outer corner portion and the portion corresponding to the inner corner portion).

As described above, when producing a complex three-dimensional fiber-reinforced plastic or preform having a plurality of convex surfaces or concave surfaces with large curvatures such as L-shaped corner channels, there are cases in the methods (1) and (2) where it is not possible to suppress the occurrence of wrinkling and bridging on a convex surface or concave surface with a large curvature.

The present invention provides a method for producing a fiber reinforced plastic which can suppress the occurrence of wrinkling and bridging in the fiber reinforced plastic, even in the case of a complex three-dimensional fiber reinforced plastic.

Solution to Problem

The present invention includes the following aspects.

[1]
A method for producing a fiber reinforced plastic which is a method for producing a fiber reinforced plastic (a) by shaping a prepreg sheet in which continuous fibers are impregnated with a resin material into a three-dimensional shape,
wherein at least a portion of the continuous fibers in an area (X) of the aforementioned prepreg sheet corresponding to an area (X') in which the aforementioned fiber reinforced plastic (a) is shear-deformed is bent in an in-plane direction in advance.

[2]
The method for producing a fiber reinforced plastic according to [1], wherein when a shear angle distribution is determined based on a fiber placement of continuous fibers in the fiber reinforced plastic of the same shape as that of the aforementioned fiber reinforced plastic (a) by simulation software capable of determining a fiber placement of continuous fibers in a three-dimensional fiber reinforced plastic, the aforementioned area (X') is an area in which a shear angle is 5° or more in the aforementioned shear angle distribution.

[3]
The method for producing a fiber reinforced plastic according to [1] or [2], further including a step of producing the aforementioned prepreg sheet so that at least a part of the aforementioned area (X) is in the same state as a state of being shear-deformed in the same direction as a direction of shear deformation in the aforementioned area (X').

[4]
The method for producing a fiber reinforced plastic according to any one of [1] to [3], wherein the aforementioned continuous fibers are bent in an in-plane direction of the aforementioned prepreg sheet by fixing the aforementioned prepreg sheet at a plurality of fixing points arranged along the in-plane direction of the aforementioned prepreg sheet, and moving at least a portion of the aforementioned plurality of fixing points in the in-plane direction of the aforementioned prepreg sheet.

[5]
The method for producing a fiber reinforced plastic according to any one of [1] to [4], further including a step of shear-deforming at least a part of the aforementioned area (X) by a shear deformation means having a plurality of fixing points that fix the aforementioned prepreg sheet and are arranged along the in-plane direction of the aforementioned prepreg sheet, and capable of moving the aforementioned fixing points in the in-plane direction of the aforementioned prepreg sheet; and a step of shaping the aforementioned prepreg sheet simultaneously with shear deformation of the aforementioned prepreg sheet or after shear deformation of the aforementioned prepreg sheet.

[6]
The method for producing a fiber reinforced plastic according to [5], wherein the aforementioned shear deformation means is a shear deformation means having a plurality of fixing points that fix the aforementioned prepreg sheet and are arranged along the in-plane direction of the aforementioned prepreg sheet so as to be positioned at lattice points of a tetragonal lattice, and capable of moving the aforementioned fixing points in the in-plane direction of the aforementioned prepreg sheet so that a unit lattice connecting the aforementioned fixing points is shear-deformed.

[7]
The method for producing a fiber reinforced plastic according to [5] or [6], wherein the aforementioned shear deformation means is capable of moving the aforementioned fixing points in the in-plane direction of the aforementioned prepreg sheet, and capable of moving the aforementioned fixing points in a direction orthogonal to the in-plane direction of the aforementioned prepreg sheet.

[8]
The method for producing a fiber reinforced plastic according to any one of [1] to [3], further including a step of using, as a prepreg sheet in which the aforementioned continuous fibers are impregnated with the resin material, a prepreg sheet obtained by arranging, on a sheet, a plurality of tow prepregs in which a tow, obtained by bundling a plurality of reinforcing fibers, is impregnated with a resin material; and aligning the aforementioned plurality of tow prepregs while bending the aforementioned tow prepreg in a portion corresponding to at least a part of the aforementioned area (X) in the in-plane direction of the aforementioned prepreg sheet, thereby producing the aforementioned prepreg sheet; and
a step of shaping the aforementioned prepreg sheet simultaneously with producing the aforementioned prepreg sheet or after producing the aforementioned prepreg sheet.

[9]
The method for producing a fiber reinforced plastic according to [8], wherein a tow prepreg corresponding to at least a part of the aforementioned area (X) is deformed to produce the aforementioned prepreg sheet so that at least a part of the aforementioned area (X) is in the same state as a state of being shear-deformed in the same direction as a direction of shear deformation in the aforementioned area (X').

[10]
The method for producing a fiber reinforced plastic according to [8] or [9], wherein the aforementioned plurality of tow prepregs are aligned to produce the aforementioned prepreg sheet by a tow prepreg placement device provided with a supply head for feeding the aforementioned tow prepreg while pressing it against a supply target, and a moving means for relatively moving the aforementioned supply head and the aforementioned supply target.

[11]
The method for producing a fiber reinforced plastic according to any one of [1] to [10], wherein the aforementioned prepreg sheet is shaped using a press mold after producing the aforementioned prepreg sheet.

[12]

The method for producing a fiber reinforced plastic according to any one of [1] to [11], wherein the aforementioned prepreg sheet is a laminated prepreg sheet in which two or more of the aforementioned prepreg sheets are laminated.

[13]

A method for producing a fiber reinforced plastic, which is a method for producing a fiber reinforced plastic (a), the method including steps of shaping a reinforcing fiber base material into a three-dimensional shape to obtain a preform (b), impregnating the aforementioned preform (b) with a resin material, and solidifying the aforementioned preform (b) impregnated with a resin material, wherein at least a part of an area (Y) of the aforementioned reinforcing fiber base material corresponding to an area (Y') in which the aforementioned preform (b) is shear-deformed is bent in an in-plane direction in advance.

[14]

The method for producing a fiber reinforced plastic according to [13], wherein when a shear angle distribution is determined based on a fiber placement of a reinforcing fiber base material in a preform of the same shape as that of the aforementioned preform (b) by simulation software capable of determining a fiber placement of a reinforcing fiber base material in a three-dimensional preform, the aforementioned area (Y') is an area in which a shear angle is 5° or more in the aforementioned shear angle distribution.

[15]

The method for producing a fiber reinforced plastic according to [13] or [14], further including a step of producing the aforementioned reinforcing fiber base material so that at least a part of the aforementioned area (Y) is in the same state as a state of being shear-deformed in the same direction as a direction of shear deformation in the aforementioned area (Y').

[16]

The method for producing a fiber reinforced plastic according to any one of [13] to [15], wherein the aforementioned reinforcing fiber base material is bent in the in-plane direction of the aforementioned reinforcing fiber base material by fixing the aforementioned reinforcing fiber base material at a plurality of fixing points arranged along the in-plane direction of the aforementioned reinforcing fiber base material, and moving at least a portion of the aforementioned plurality of fixing points in the in-plane direction of the aforementioned reinforcing fiber base material.

[17]

The method for producing a fiber reinforced plastic according to any one of [13] to [16], further including a step of shear-deforming at least a part of the aforementioned area (Y) by a shear deformation means having a plurality of fixing points that fix the aforementioned reinforcing fiber base material and are arranged along the in-plane direction of the aforementioned reinforcing fiber base material, and capable of moving the aforementioned fixing points in the in-plane direction of the aforementioned reinforcing fiber base material; and a step of shaping the aforementioned reinforcing fiber base material simultaneously with shear deformation of the aforementioned reinforcing fiber base material or after shear deformation of the aforementioned reinforcing fiber base material.

[18]

The method for producing a fiber reinforced plastic according to [17], wherein the aforementioned shear deformation means is a shear deformation means having a plurality of fixing points that fix the aforementioned reinforcing fiber base material and are arranged along the in-plane direction of the aforementioned reinforcing fiber base material so as to be positioned at lattice points of a tetragonal lattice, and capable of moving the aforementioned fixing points in the in-plane direction of the aforementioned reinforcing fiber base material so that a unit lattice connecting the aforementioned fixing points is shear-deformed.

[19]

The method for producing a fiber reinforced plastic according to [17] or [18], wherein the aforementioned shear deformation means is capable of moving the aforementioned fixing points in the in-plane direction of the aforementioned reinforcing fiber base material, and capable of moving the aforementioned fixing points in a direction orthogonal to the in-plane direction of the aforementioned reinforcing fiber base material.

Advantageous Effects of Invention

According to the method for producing a fiber reinforced plastic of the present invention, even in the case of a complex three-dimensional fiber reinforced plastic, it is possible to suppress the occurrence of wrinkling and bridging in the fiber reinforced plastic.

DETAILED DESCRIPTION OF THE INVENTION

Figure 1:
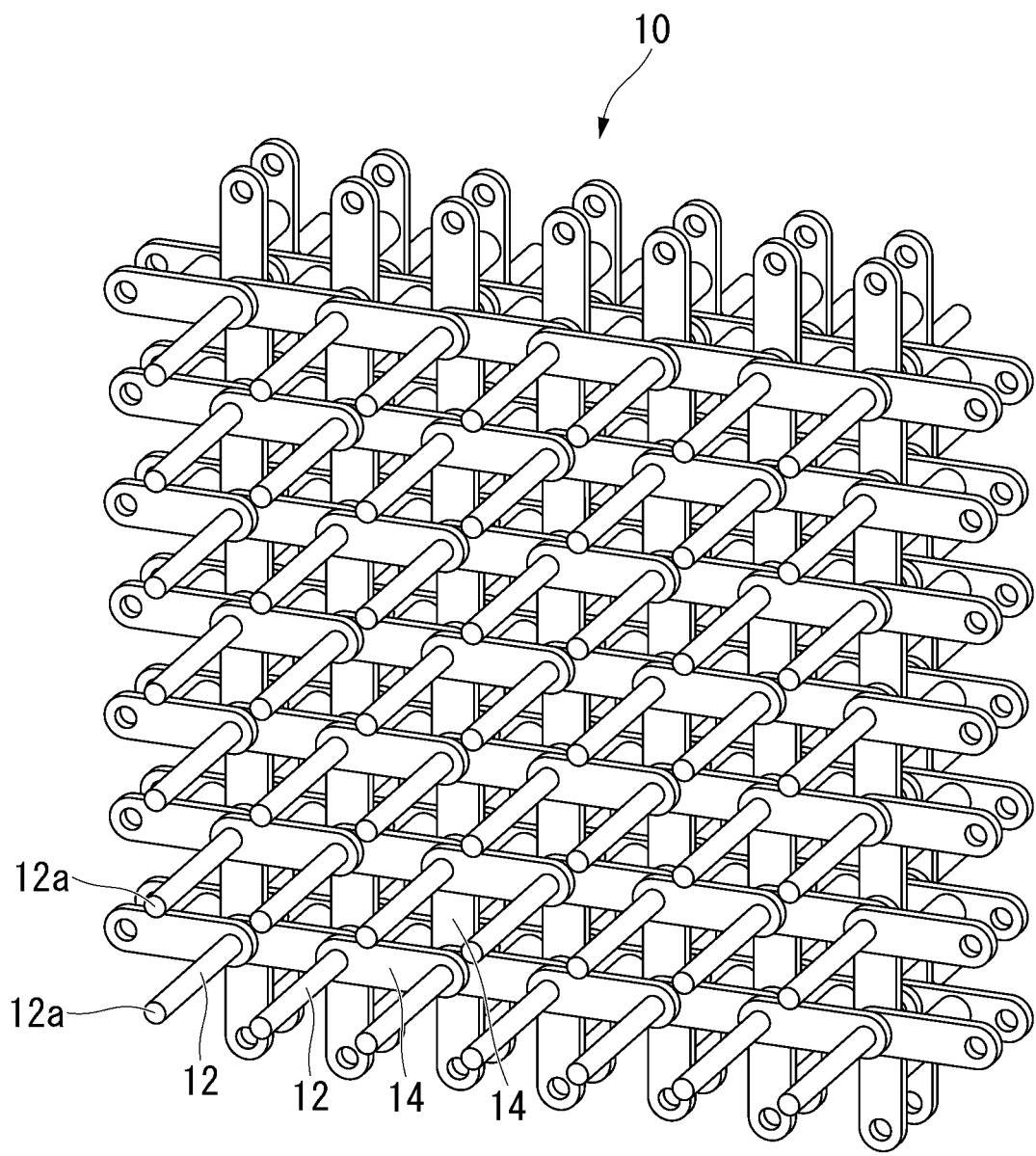
FIG. 1 is a perspective view showing an example of a shear deformation means.

The following definitions of terms apply throughout the present specification and claims.

The term "shear deformation" means deformation that occurs when at least a part of an area in a prepreg sheet, a laminated prepreg sheet or a reinforcing fiber base material in which reinforcing fibers are oriented in one axial direction (0° direction) or two or more axial directions (for example, 0° and 90° directions) is extended in the in-plane direction and in a direction in which the reinforcing fibers are not oriented (for example, the direction of +45° or −45°).

There are two meanings for the term "preform": i.e., a preformed product before being processed into a final molded article among molded products obtained by shaping a prepreg sheet into a three-dimensional shape; or a three-dimensional reinforcing fiber base material obtained by shaping a reinforcing fiber base material which is not impregnated with a resin material (a small amount of resin may be adhered) into a three-dimensional shape. However, in the present invention, the three-dimensional reinforcing fiber base material is defined as a preform.

The term "fiber reinforced plastic" includes final molded articles that can themselves be products, and preformed products before being processed into final molded articles by press molding again, joining with other parts, or the like.

The term "tetragonal lattice" means an array pattern having a quadrangular shape in which four closest lattice points exist with respect to one lattice point.

The term "grid line" means a line connecting between the closest lattice points.

The term "unit lattice" means an area surrounded by grid lines. In the case of a tetragonal lattice, it is an area having a quadrangular shape.

The symbol "-" indicating a numerical range means that numerical values described before and after that are included as the lower limit value and the upper limit value.

The dimensional ratios in FIGS. 1 to 19 are different from the actual ones for the convenience of explanation.

[First Aspect of Method for Producing Fiber Reinforced Plastic and Second Aspect of Method for Producing Fiber Reinforced Plastic]

A first aspect of a method for producing a fiber reinforced plastic (hereinafter, also simply referred to as the "first aspect of the present invention") and a second aspect of a method for producing a fiber reinforced plastic (hereinafter, also simply referred to as the "second aspect of the present invention") of the present invention are methods for producing a fiber reinforced plastic (a) by shaping a prepreg sheet in which continuous fibers are impregnated with a resin material into a three-dimensional shape, and characterized in that the continuous fibers in at least a part of an area (X) of the prepreg sheet corresponding to an area (X') in which this fiber reinforced plastic (a) is shear-deformed are bent in the in-plane direction in advance.

Here, as a method of determining the area (X') in which the fiber reinforced plastic is shear-deformed, a method of determining a shear angle distribution based on an ideal fiber placement in which wrinkling and bridging do not occur using simulation software capable of determining a fiber placement of continuous fibers in a three-dimensional fiber reinforced plastic and predicting a shear-deformed area including an area where the shear angle is large; a method of measuring a shear angle by manually attaching a prepreg sheet to a press mold so that wrinkling and bridging do not occur, and the like can be mentioned.

As a method of determining the area (X'), since it is possible to determine the shear-deformed area (X') accurately and efficiently, and to produce the three-dimensional fiber reinforced plastic (a) accurately and efficiently, a method using simulation software is preferred.

The determination of the area (X') using simulation software is performed, for example, as follows.

First, the shear angle distribution based on the fiber placement of continuous fibers in the fiber reinforced plastic having the same shape as that of the fiber reinforced plastic (a) is determined by the simulation software capable of determining the fiber placement of the continuous fibers in the three-dimensional fiber reinforced plastic.

Examples of the simulation software include Fibersim (registered trademark, manufactured by Siemens PLM Software), LS-DYNA (manufactured by Livermore Software Technology Corporation), and the like. As a method of determining the shear angle distribution using Fibersim (registered trademark), the method described in Patent Document 3 mentioned above, and the like can be mentioned.

Subsequently, in the shear angle distribution determined in this manner, it is preferable to adopt an area where the shear angle is 5° or more as the area (X'). The area (X') is more preferably an area where the shear angle is 15° or more in the shear angle distribution, and even more preferably an area where the shear angle is 30° or more in the shear angle distribution from the viewpoints that specific parts of the prepreg sheet corresponding to the places where wrinkling and bridging easily occur in the fiber reinforced plastic (a) can be selectively shear-deformed, and the occurrence of wrinkling and bridging can be reliably suppressed.

A specific example of the method of determining the area (X') by the simulation software will be described below by taking an L-shaped corner channel 30 shown in FIG. 5 as an example.

Figure 6:
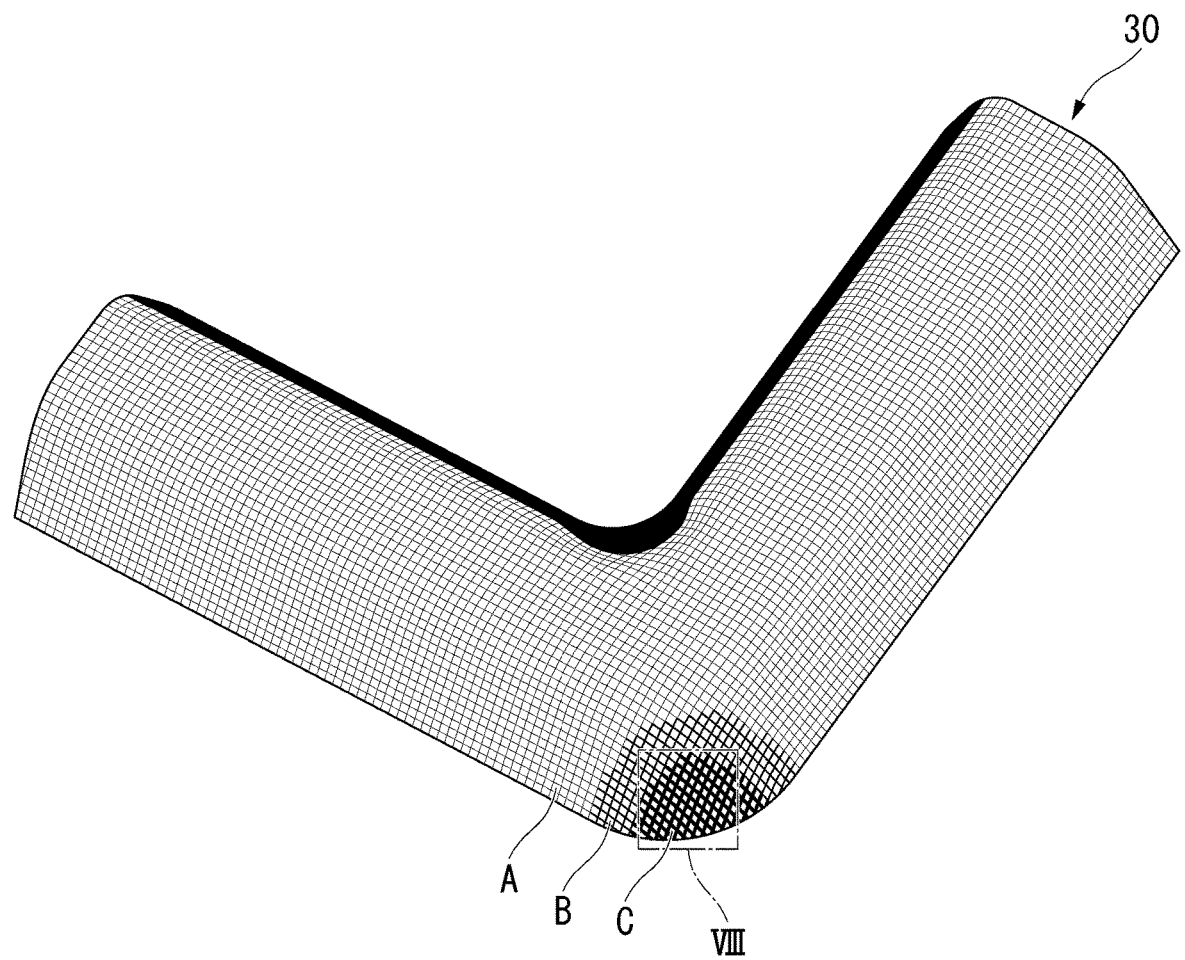
FIG. 6 is a view showing a shear angle distribution (outer corner side) based on a fiber placement of continuous fibers in an L-shaped corner channel obtained by simulation software.
Figure 7:
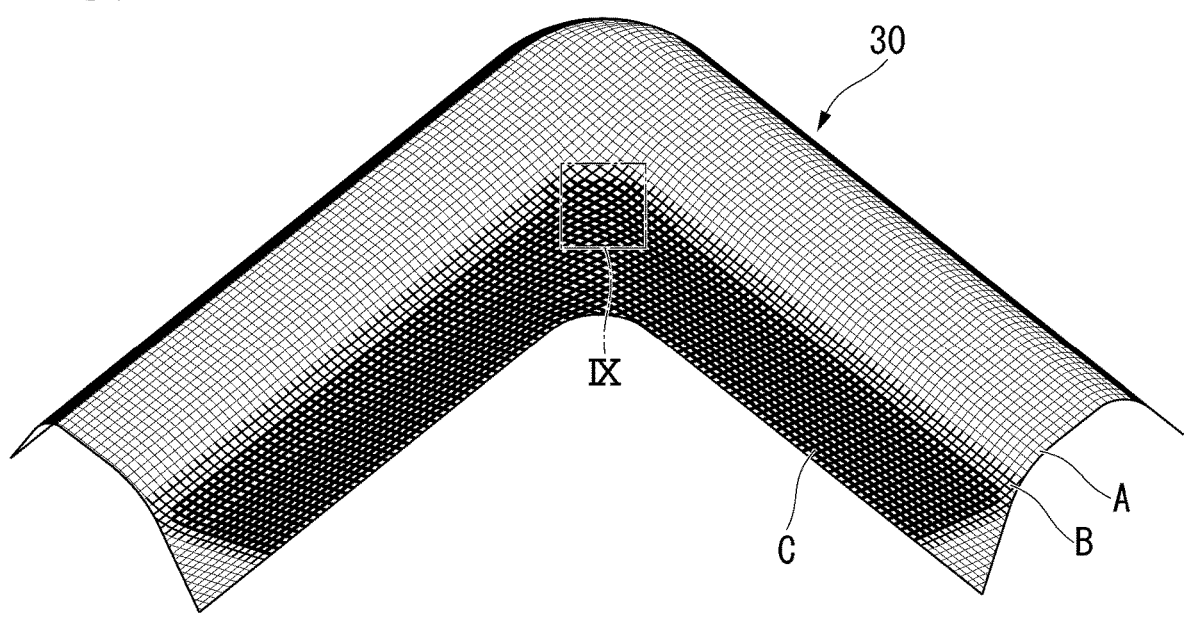
FIG. 7 is a view showing a shear angle distribution (inner corner side) based on a fiber placement of continuous fibers in an L-shaped corner channel obtained by simulation software.

A shear angle distribution based on the fiber placement of continuous fibers in the L-shaped corner channel 30 as shown in FIGS. 6 and 7 is obtained by the simulation software. In the shear angle distribution in the illustrated example, lines drawn in a grid-like manner represent the fiber placement of continuous fibers, and an area with the thinnest line is an area A where a shear angle is 0° or more and less than 15°, an area with the second thickest line is an area B where a shear angle is 15° or more and less than 30°, and an area with the thickest line is an area C where a shear angle is 30° or more.

Figure 5:
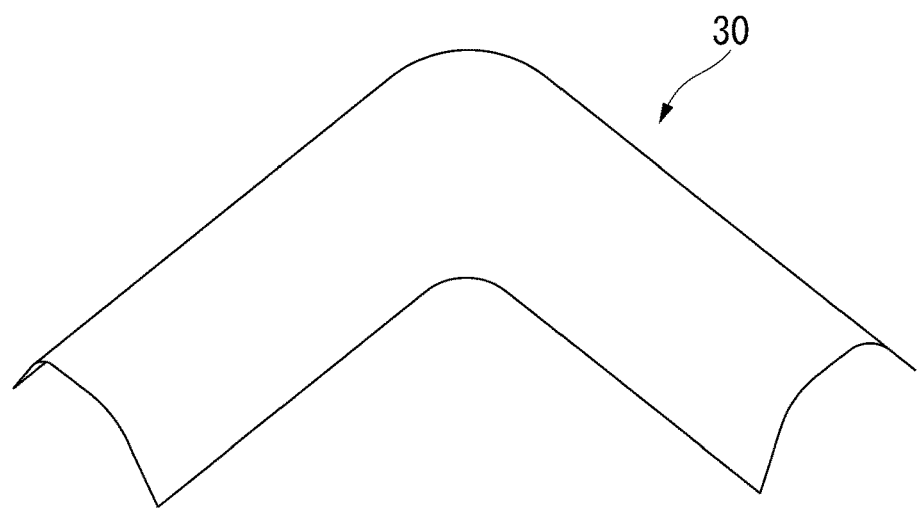
FIG. 5 is a perspective view showing an L-shaped corner channel which is an example of a fiber reinforced plastic.

In the L-shaped corner channel 30 shown in FIG. 5, the area C where the shear angle is 30° or more in the shear angle distribution shown in FIGS. 6 and 7 is the area where wrinkling and bridging are most likely to occur in the fiber reinforced plastic. Therefore, the area C may be adopted as the area (X').

Further, in the first aspect of the present invention and the second aspect of the present invention, it is preferable to produce the prepreg sheet so that at least a part of the area (X) of the prepreg sheet is in the same state as a state of being shear-deformed in the same direction as the direction of shear deformation in the shear-deformed area (X') in the fiber reinforced plastic (a).

<First Aspect of Method for Producing Fiber Reinforced Plastic>

The first aspect of the method for producing a fiber reinforced plastic of the present invention is a method for producing the fiber reinforced plastic (a) by shaping a prepreg sheet in which continuous fibers are impregnated with a resin material into a three-dimensional shape, and is characterized in that the continuous fibers are bent in the in-plane direction of the prepreg sheet by fixing the prepreg sheet at a plurality of fixing points arranged along the in-plane direction of the prepreg sheet, and moving at least a portion of the plurality of fixing points in the in-plane direction of the prepreg sheet.

For example, the first aspect of the method for producing a fiber reinforced plastic of the present invention includes the following steps (I) to (II).

Step (I): A step of shear-deforming at least a part of the area (X) of the prepreg sheet corresponding to the shear-deformed area (X') in the fiber reinforced plastic (a) when shaping the prepreg sheet into a three-dimensional shape by a specific shear deformation means.

Step (II): A step of shaping the prepreg sheet to obtain a fiber reinforced plastic (a) simultaneously with shear deformation of the prepreg sheet of step (I) or after shear deformation of the prepreg sheet of step (I).

Even when the intended fiber reinforced plastic (a) has a complicated three-dimensional shape by the above-described steps, the occurrence of wrinkling during molding, and in particular, the occurrence of bridging on the concave surface of the inner corner portion and the like can be suppressed.

In the first aspect of the method for producing a fiber reinforced plastic of the present invention, a specific shear deformation means can be used as a shear deformation means for shear deformation of the prepreg sheet. The shear deformation means will be described below.

(Shear Deformation Means)

The shear deformation means suitably used in the present invention is a shear deformation means having a plurality of fixing points that fix the prepreg sheet and are arranged along the in-plane direction of the prepreg sheet, and capable of moving the fixing points each independently in the in-plane direction of the prepreg sheet.

FIG. 1 is a perspective view showing an example of a shear deformation means.

A shear deformation means 10 is a link array having a plurality of rods 12 arranged in parallel with and equally spaced from each other so as to stand upright on lattice points of a tetragonal lattice; and a plurality of links 14 forming grid lines of the tetragonal lattice in which rods 12 are inserted and arranged in each of the through holes at both ends so as to connect between the closest rods 12.

At least one end of the rod 12 serves as a fixing point 12a by which a prepreg sheet is fixed. Therefore, the shear deformation means 10 has a plurality of fixing points 12a that fix a prepreg sheet and are arranged along the in-plane direction of the prepreg sheet so as to be positioned at lattice points of the tetragonal lattice.

Figure 2:
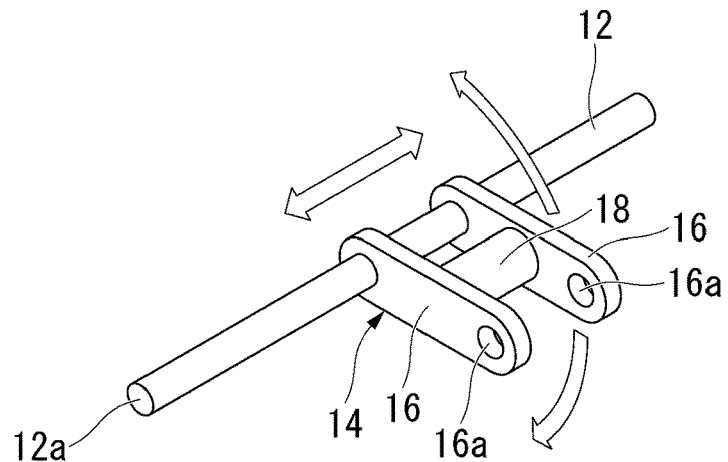
FIG. 2 is a perspective view showing a state in which a rod is inserted through a through hole of a link in the shear deformation means.

As shown in FIG. 2, the link 14 includes two elongated plate-like portions 16 disposed in parallel and spaced apart; and a connecting portion 18 connecting the plate-like portions 16 at the centers of the plate-like portions 16. Through holes 16a through which the rods 12 can be inserted are formed at both ends of the plate-like portions 16.

Figure 3:
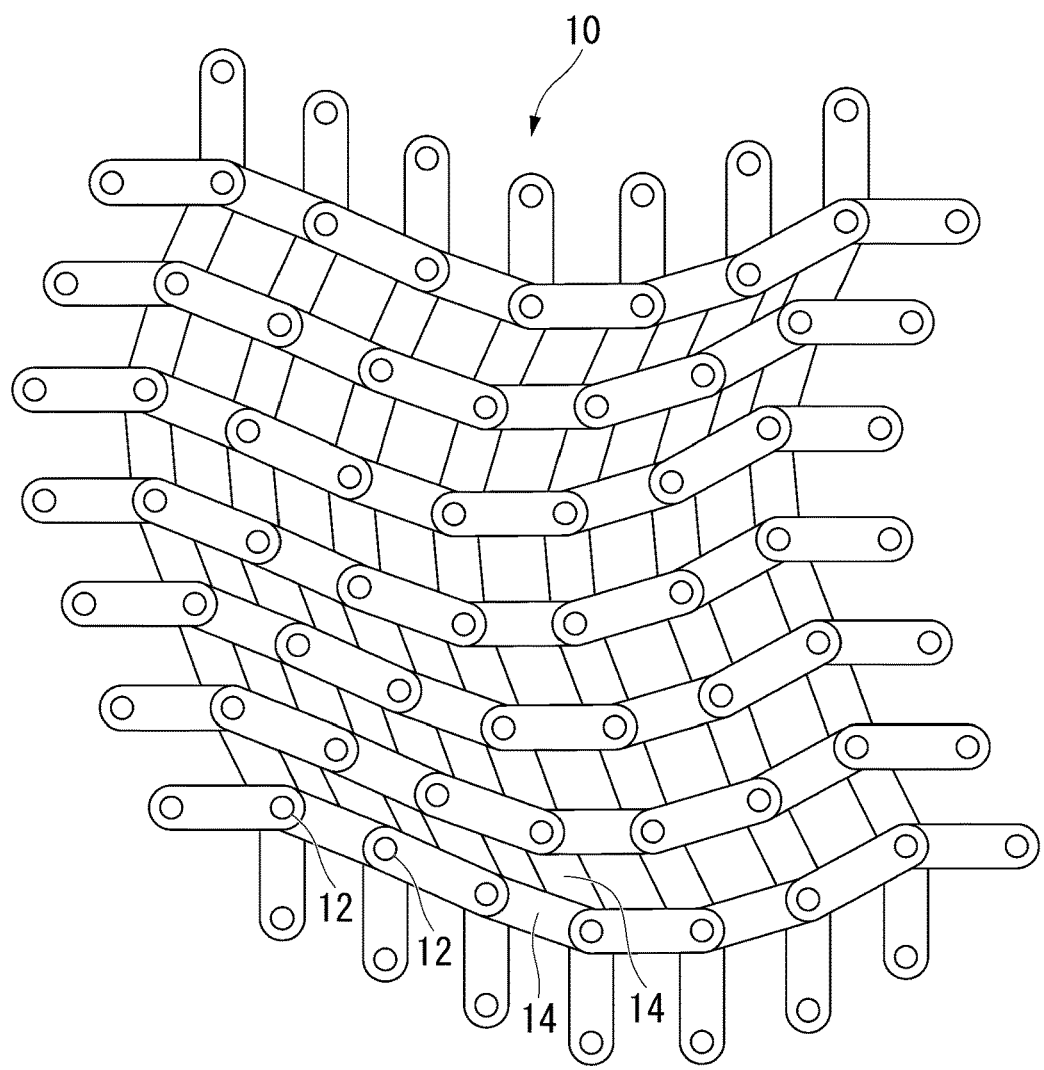
FIG. 3 is a top view showing a state of shear-deforming a unit lattice surrounded by links forming a grid line of a tetragonal lattice in a shear deformation means.

As shown in FIG. 2, by inserting the rod 12 into the through hole 16a of the link 14, the link 14 is configured to be freely rotatable around the rod 12 with the rod 12 serving as a rotation axis. As a result, as shown in FIG. 3, in the shear deformation means 10, the unit lattice surrounded by the links 14 forming the grid lines of the tetragonal lattice is configured to be deformable from a square to a rhombus. That is, the shear deformation means 10 is configured to be capable of moving the fixing points 12a in the in-plane direction of the prepreg sheet so that the unit lattice connecting the fixing points 12a located at the lattice points is shear-deformed.

Further, as shown in FIG. 2, by inserting the rod 12 into the through hole 16a of the link 14, the rod 12 is configured to be freely slidable in the longitudinal direction of the rod 12 with the through hole 16a of the link 14 serving as a guide hole. As a result, the shear deformation means 10 is configured to be capable of moving the fixing point 12a in the direction orthogonal to the in-plane direction of the prepreg sheet.

The length of the link 14 is appropriately selected according to the degree of complexity of the three-dimensional shape of the fiber reinforced plastic. In the fiber reinforced plastic (a), when the area (X') subjected to shear deformation is present in a narrow range of a portion of the fiber reinforced plastic (a), it is also possible to shorten the links 14 located in the area (X) of the prepreg sheet corresponding to the area (X'), and to elongate the links 14 located in other areas. However, in order to apply the shear deformation means 10 generally to the production of various fiber reinforced plastics, it is preferable that the lengths of the links 14 be short and the same. The length of the link 14 is preferably from 2 to 200 mm, and more preferably from 10 to 100 mm.

It should be noted that another link different from the link 14 may be added to the shear deformation means 10 in order to support the shear deformation means 10 horizontally, connect the shear deformation means 10 with each other, and position the shear deformation means 10 in an initial state in which the tetragonal lattice becomes a quadrangle. In this case, the length of another link different from the link 14 is not restricted because it does not directly participate in the shear deformation of the fiber reinforced plastic (a).

Figure 4:
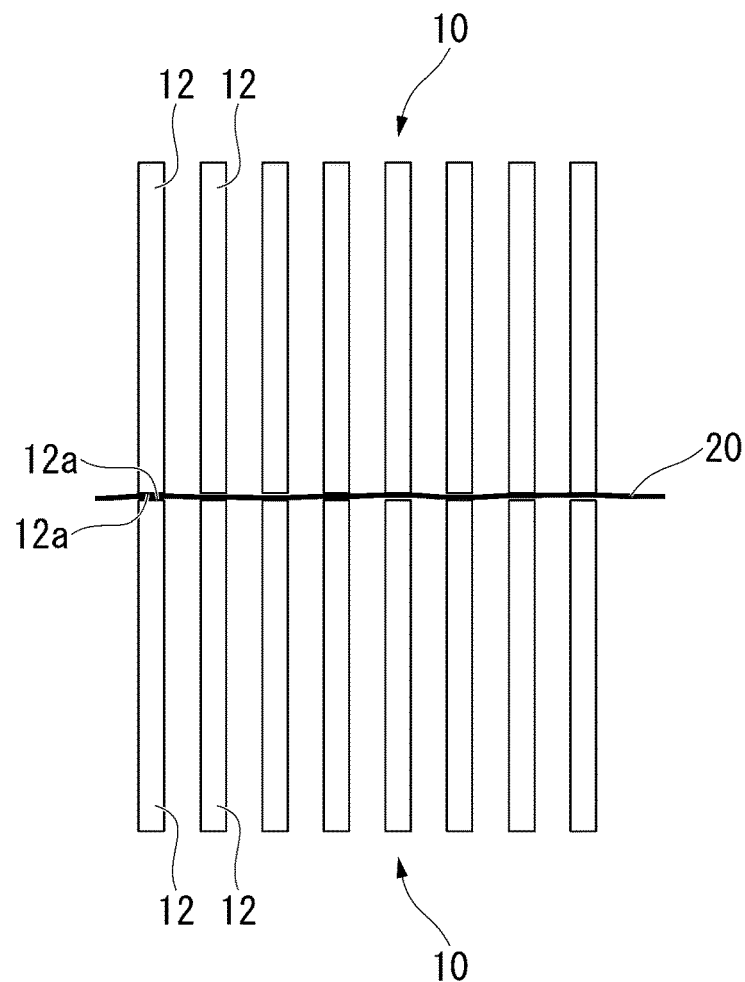
FIG. 4 is a side view showing a state in which a prepreg sheet is sandwiched by a pair of shear deformation means.

Fixation of the prepreg sheet to the fixing point 12a of the rod 12 in the shear deformation means 10 is carried out, for example, as shown in FIG. 4, by disposing the shear deformation means 10 above and below a prepreg sheet 20 so as to sandwich the prepreg sheet 20, aligning the fixing points 12a of the respective rods 12 in the upper and lower shear deformation means 10 so as to butt against each other via the prepreg sheet 20, and holding the prepreg sheet 20 by the respective rods 12 from above and below. It should be noted that in FIG. 4, only the rods 12 in the shear deformation means 10 are shown in the drawing, and illustration of the link 14 is omitted.

The fixing point 12a of the rod 12 may have a sharp protrusion such as a needle-like protrusion in order to suppress positional deviation with the prepreg sheet 20, and the end face may be processed into an uneven shape. When the fixing point 12a has a sharp protrusion, the prepreg sheet or the reinforcing fiber base material may be fixed to the fixing point 12a of the rod 12 by only one shear deformation means 10, without using a pair of shear deformation means 10 by making the protrusion to penetrate through the prepreg sheet 20, and attaching a fastener to the tip of the protrusion so that the prepreg sheet 20 is not detached.

It should be noted that the shear deformation means is not limited to the shear deformation means 10 of the illustrated example, and any shear deformation means having a plurality of fixing points that fix the prepreg sheet and are arranged along the in-plane direction of the prepreg sheet, and capable of moving the fixing points each independently in the in-plane direction of the prepreg sheet can be used.

(Continuous Fiber)

The continuous fiber means that the fiber length per one fiber is 50 mm or more, and in the present invention, a reinforcing fiber base material using continuous fibers can be mentioned.

(Reinforcing Fiber Base Material)

The reinforcing fiber base material is a sheet-like base material containing reinforcing fibers.

The reinforcing fiber base material may be a tow (bundle) in which reinforcing fibers are oriented in a uniaxial direction, or may be a woven fabric in which reinforcing fibers are oriented in orthogonal biaxial directions.

Examples of the woven fabric include plain weave fabrics, twill weave fabrics, satin weave fabrics, cord fabrics, non-crimp fabrics and the like.

Examples of the reinforcing fibers include inorganic fibers, organic fibers, metal fibers, and composite fibers thereof.

Examples of the inorganic fibers include carbon fibers, glass fibers, graphite fibers, silicon carbide fibers, silicon nitride fibers, alumina fibers, tungsten carbide fibers, boron fibers and the like.

Examples of the organic fibers include aramid fibers, high density polyethylene fibers, nylon fibers, polyester fibers and the like.

Examples of the metal fibers include stainless steel fibers, iron fibers, titanium fibers, carbon fibers coated with a metal, and the like.

As a reinforcing fiber, a carbon fiber is preferable from the viewpoint that a lightweight, high-rigidity and high-strength fiber reinforced plastic can be obtained, and the shaping properties of a prepreg sheet or a reinforcing fiber base material is favorable.

A single type of reinforcing fiber may be used alone, or two or more types may be used in combination.

The reinforcing fiber base material may have a resin attached to one side or both sides within a range that does not inhibit the impregnation of a resin material to become a matrix resin of the fiber reinforced plastic. Examples of the resin include thermosetting resins (epoxy resins and the like) and thermoplastic resins (acrylic resins, nylon resins, epoxy resins and the like).

The reinforcing fiber base material may be those obtained by laminating a plurality of reinforcing fiber base materials. In the case where a plurality of reinforcing fiber base materials are laminated in such a manner that the orientations of the reinforcing fibers are made to coincide with or to be orthogonal to each other, in the first aspect of the present invention, the lamination may be performed before shaping the prepreg sheet.

(Resin Material)

The resin material contains a resin and, if necessary, an additive.

As the resin, a thermosetting resin or a thermoplastic resin can be mentioned.

As the thermosetting resin, an epoxy resin, an unsaturated polyester resin, an acrylic resin, a vinyl ester resin, a phenol resin, a urethane resin, a benzoxazine resin and the like can be mentioned. As the thermosetting resin, an epoxy resin is preferable from the viewpoint that a high-strength fiber reinforced plastic can be obtained.

Examples of the thermoplastic resin include polyamides (nylon 6, nylon 66, and the like), polyolefins (polyethylenes, polypropylenes, and the like), modified polyolefins, polyesters (polyethylene terephthalates, polybutylene terephthalates, and the like), polycarbonates, polyamideimides, polyphenylene oxides, polysulfones, polyether sulfones, polyetheretherketones, polyetherimides, polystyrenes, acrylonitrile-butadiene-styrene copolymers, polyphenylene sulfides, liquid crystalline polyesters, acrylonitrile-styrene copolymers and the like.

As the additives, curing agents, mold releasing agents, defoaming agents, flame retardants, weather resistance improvers, antioxidants, heat stabilizers, ultraviolet absorbers, plasticizers, lubricants, colorants, compatibilizers, fillers, conductive fillers and the like can be mentioned.

(Prepreg Sheet)

The prepreg sheet is one in which continuous fibers are impregnated with a resin material.

The prepreg sheet may be a UD prepreg in which reinforcing fibers are oriented in a uniaxial direction, or may be a cross prepreg in which reinforcing fibers are oriented in orthogonal biaxial directions.

The prepreg sheet may be a lamination of a plurality of prepreg sheets of the same type of reinforcing fibers, or may be a lamination of a plurality of prepreg sheets of different types of reinforcing fibers. When laminating a plurality of prepreg sheets while making the orientations of reinforcing fibers to coincide with or to be orthogonal to each other, they may be laminated prior to step (I), or may be laminated between step (I) and step (II). In the case of the so-called quasi-isotropic lamination in which a prepreg sheet having fiber orientations of 0° and 90° and a prepreg sheet having fiber orientations of ±45° are laminated, the lamination is conducted between step (I) and step (II).

(Step (I))

In step (I), at least a part of the area (X) of the prepreg sheet corresponding to the shear-deformed area (X') in the fiber reinforced plastic (a) when shaping the prepreg sheet into a three-dimensional shape is shear-deformed by a specific shear deformation means.

Figure 8:
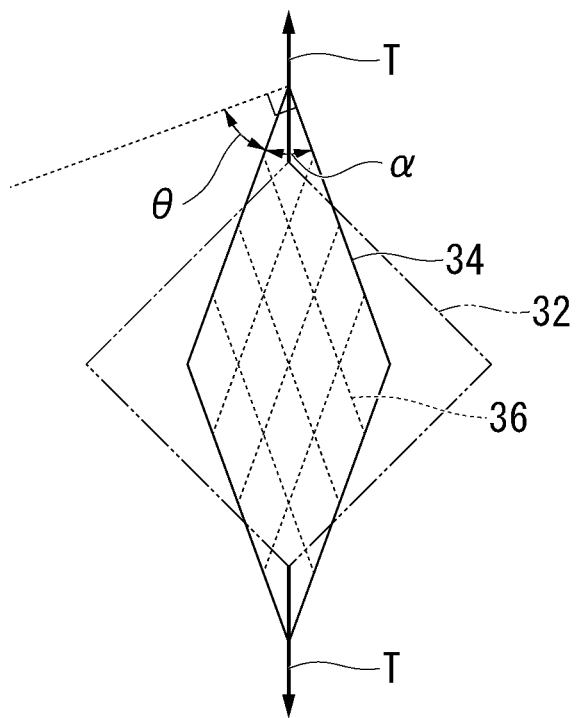
FIG. 8 is a schematic view showing a state of shear deformation of a prepreg sheet in an outer corner portion VIII in the shear angle distribution of FIG. 6.

FIG. 8 is a schematic view showing a state of shear deformation of a prepreg sheet in an outer corner portion VIII in the shear angle distribution of FIG. 6.

In the outer corner portion, the shear deformation direction is a direction (vertical direction) orthogonal to the bending direction. When producing a corner channel 30, a tension T in the vertical direction is applied to the prepreg sheet, and when the prepreg sheet extends in the vertical direction and is shear-deformed, a square shape 32 of a two-dot chain line changes to a rhombus shape 34 of a solid line. A broken line in the rhomboid shape indicates a fiber orientation 36 of the reinforcing fibers in the prepreg sheet or corner channel 30. When α is defined as a crossing angle of the reinforcing fibers in the extension direction (direction of shear deformation), a shear angle θ is 90−α.

Figure 9:
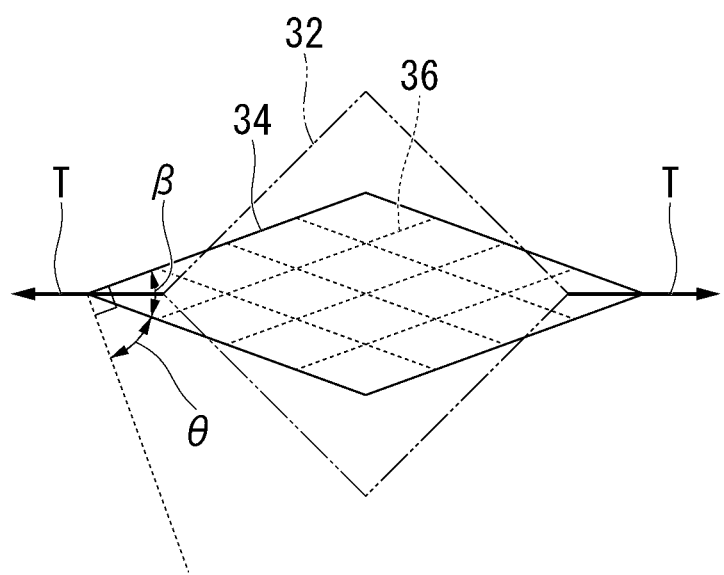
FIG. 9 is a schematic view showing a state of shear deformation of a prepreg sheet in an inner corner portion IX in the shear angle distribution of FIG. 7.

FIG. 9 is a schematic view showing a state of shear deformation of a prepreg sheet in an inner corner portion IX in the shear angle distribution of FIG. 7.

In the inner corner portion, the shear deformation direction is the bending direction (lateral direction). When producing the corner channel 30, a tension T in the lateral direction is applied to the prepreg sheet, and when the prepreg sheet extends in the lateral direction and is shear-deformed, the square shape 32 of the two-dot chain line changes to the rhombus shape 34 of the solid line. A broken line in the rhomboid shape indicates the fiber orientation 36 of the reinforcing fibers in the prepreg sheet or corner channel 30. When β is defined as a crossing angle of the reinforcing fibers in the extension direction (direction of shear deformation), the shear angle θ is 90−β.

Next, a specific example of a method of shear-deforming a prepreg sheet by shear deformation means will be shown below by taking the L-shaped corner channel 30 shown in FIG. 5 as an example.

The prepreg sheet to be shear-deformed may have a size larger than that of the corner channel 30 on the premise of cutting excess portions off after shaping; or it may be cut out in advance so as to have just the same size and shape of the corner channel 30 after shaping.

When laminating a plurality of prepreg sheets, it is possible to simultaneously shear and deform the plurality of prepreg sheets by laminating while making the orientations of reinforcing fibers to coincide with or to be orthogonal to each other.

Figure 10:
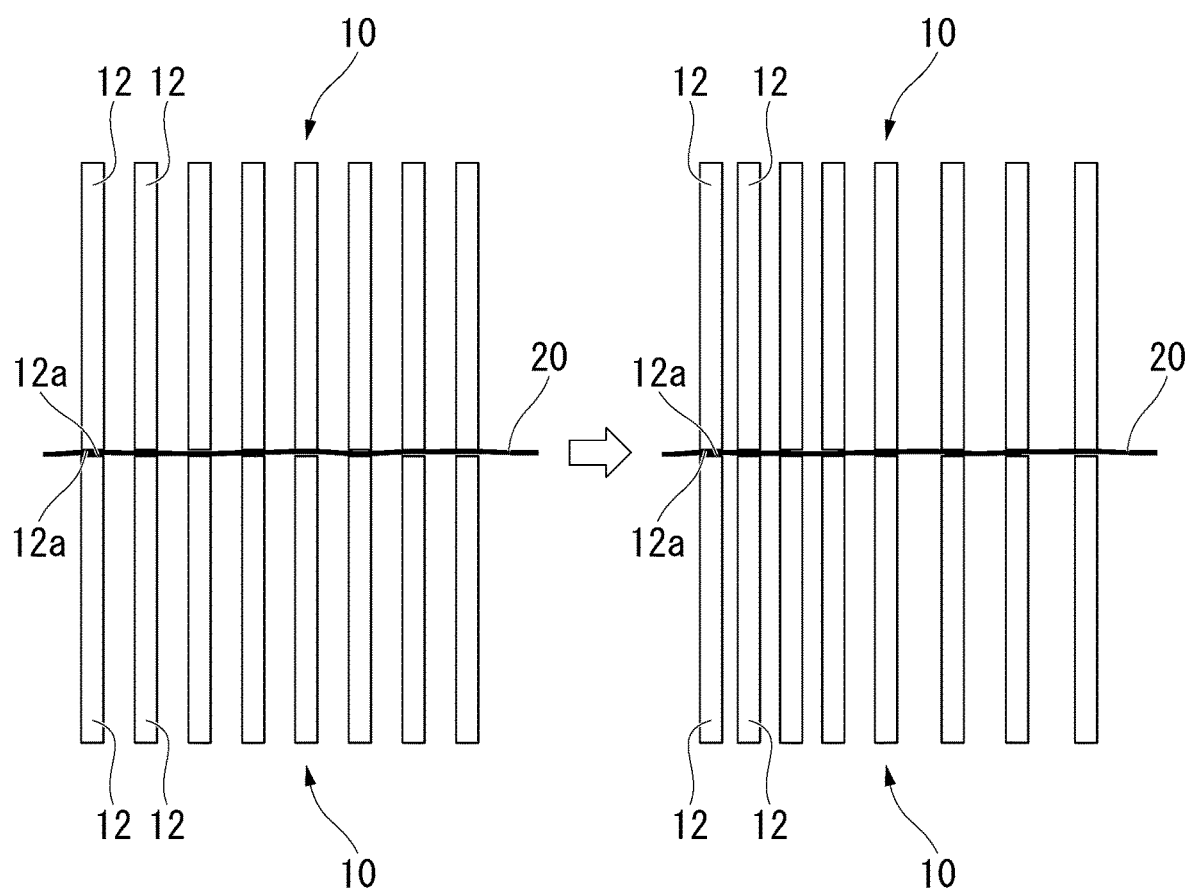
FIG. 10 is a side view showing a state in which a prepreg sheet is sandwiched by a pair of shear deformation means, and a change in the distance between rods when a part of the unit lattice of the shear deformation means is shear-deformed, which is also an X-X sectional view in FIG. 11.

As shown on the left side of FIG. 10, a prepreg sheet 20 is placed on the fixing point 12a of the shear deformation means 10 so that the fiber orientation of the reinforcing fibers in the prepreg sheet 20 coincides with the grid line (direction of the link 14 (not shown)) of the tetragonal lattice of the shear deformation means 10.

Here, in the case where the prepreg sheet 20 has reinforcing fibers oriented in a uniaxial direction, the uniaxial direction of the prepreg sheet 20 and grid lines in one direction (direction of the link 14) among the grid lines in two directions of the tetragonal lattice of the shear deformation means 10 are made to coincide. When the prepreg sheet 20 is one in which reinforcing fibers are oriented in two axial directions, the two axial directions of the prepreg sheet 20 and the grid lines (direction of the link 14) in two directions of the tetragonal lattice of the shear deformation means 10 are made to coincide.

As shown on the left side of FIG. 10, another shear deformation means 10 is further disposed on the prepreg sheet 20, and the fixing points 12a of the respective rods 12 in the upper and lower shear deformation means 10 are aligned so as to butt against each other through the prepreg sheet 20, and the prepreg sheets 20 is held by being sandwiched by the respective rods 12 from above and below. It should be noted that in FIG. 10, only the rods 12 in the shear deformation means 10 are shown in the drawing, and illustration of the link 14 is omitted.

At least a part of the area (X) of the prepreg sheet 20 is shear-deformed by heating and softening the prepreg sheet 20 by infrared rays, hot air or the like, and shear-deforming a predetermined portion of the shear deformation means 10 at a predetermined shear angle in a predetermined direction. The prepreg sheet 20 which has been shear-deformed is cooled and fixed by a process such as air cooling, mold heat absorption, mold cooling or the like.

Figure 11:
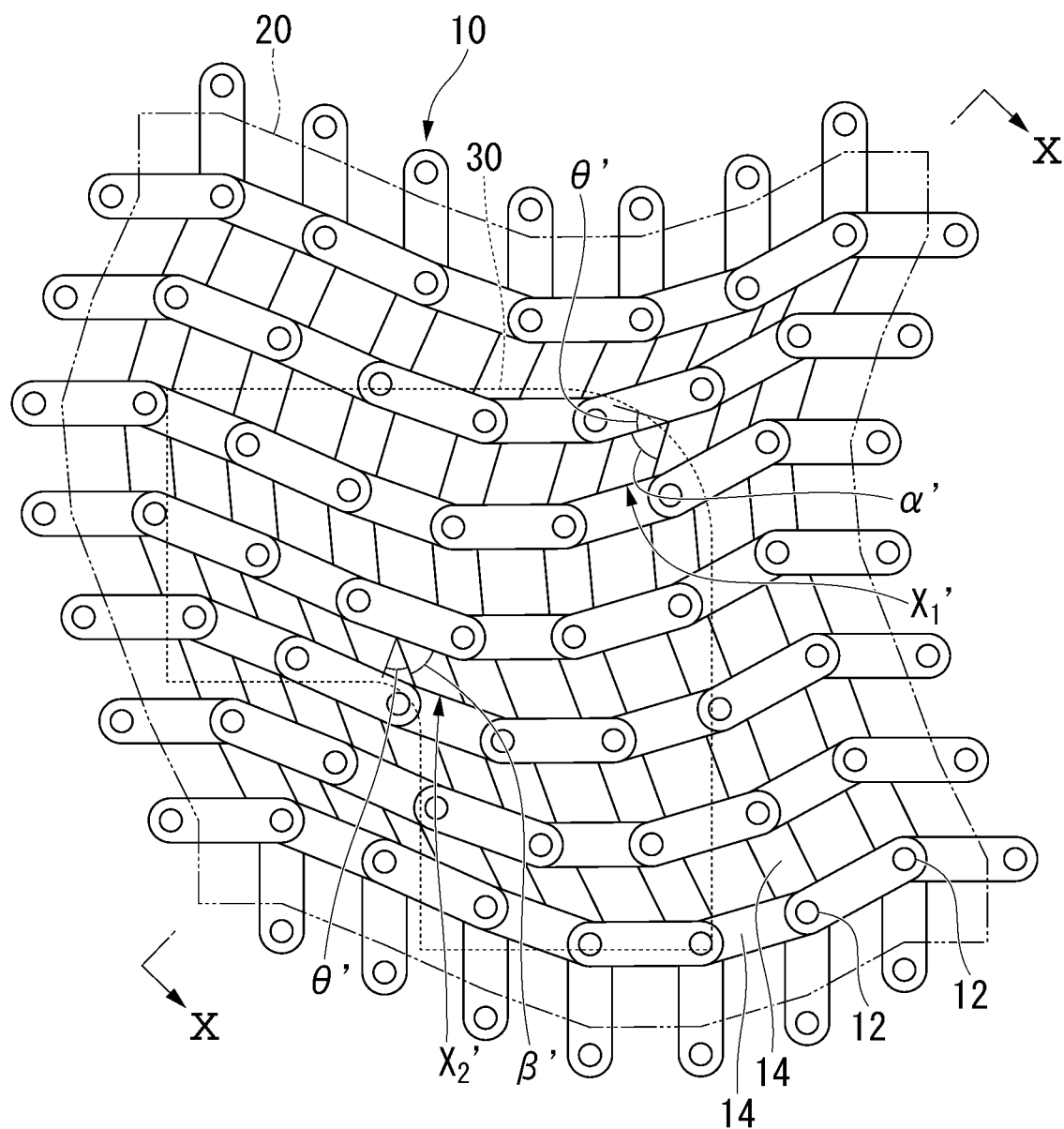
FIG. 11 is a top view showing a state of shear-deforming a unit lattice of a shear deformation means in which a prepreg sheet is fixed to a fixing point.

FIG. 11 is a top view showing a state where a unit lattice of the shear deformation means 10 is shear-deformed so that at least a part of the area (X) of the prepreg sheet 20 corresponding to the area (X') is shear-deformed. Further, the right side of FIG. 10 is a cross-sectional view taken along the line X-X in FIG. 11, and is a side view showing a change in the distance between the rods 12 when the unit lattice of the shear deformation means 10 is shear-deformed.

As shown in FIGS. 10 and 11, in the upper and lower shear deformation means 10, the fixing points 12a, that is, the rods 12 are moved in the in-plane direction of the prepreg sheet 20 so that the unit lattice connecting the fixing points 12a located at the lattice points is shear-deformed. As a result, at least a part of the area (X) of the prepreg sheet 20 corresponding to the area (X') is shear-deformed by the shear deformation means 10.

As shown in FIG. 11, in a portion corresponding to the area (X') on the outer corner side of the L-shaped corner channel 30 (hereinafter also referred to as the area (X1')), the direction of shear deformation of the unit lattice of the shear deformation means 10 is a direction connecting the outer corner and the inner corner. By shear deformation of the unit lattice of the shear deformation means 10, tension is applied to the area (X) on the outer corner side of the prepreg sheet 20 (hereinafter also referred to as the area (X1)), and the area (X1) of the prepreg sheet 20 is shear-deformed by extending in the same direction as the direction of shear deformation (extension direction of the reinforcing fiber base material) in the area (X1') of the corner channel 30. In a portion corresponding to the area (X1') of the corner channel 30, a crossing angle α' of the grid lines in the direction of shear deformation of the unit lattice of the shear deformation means 10 is substantially the same as the crossing angle α of reinforcing fibers in the direction of shear deformation of the area (X1') of the corner channel 30. That is, in the portion corresponding to the area (X1') of the corner channel 30, a shear angle θ' of the unit lattice of the shear deformation means 10 (the shear angle of the area (X1) of the prepreg sheet 20) is substantially the same as the shear angle θ in the area (X1') of the corner channel 30.

As a result of shear deformation of the area (X1) of the prepreg sheet 20 in advance by extending in the same direction as the direction of shear deformation (extension direction of the reinforcing fiber base material) in the area (X1') of the corner channel 30, that is, as a result of producing the prepreg sheet 20 so that the area (X1) of the prepreg sheet 20 is in the same state as a state of being shear-deformed in the same direction as the direction of shear deformation in the area (X1') of the corner channel 30, the area (X1) of the prepreg sheet 20 can more easily follow the outer corner portion of the press mold when shaping the prepreg sheet 20 by the press mold in step (II), and the occurrence of wrinkling in the area (X1') of the corner channel 30 can be reliably suppressed.

As a result of making the shear angle in the area (X1) of the prepreg sheet 20 substantially the same as the shear angle θ in the area (X1') of the corner channel 30, that is, as a result of producing the prepreg sheet 20 so that the area (X1) of the prepreg sheet 20 is in the same state as a state of being shear-deformed in the same direction as the direction of shear deformation in the area (X1') of the corner channel 30, the area (X1) of the prepreg sheet 20 can more easily follow the outer corner portion of the press mold when shaping the prepreg sheet 20 by the press mold in step (II), and the occurrence of wrinkling in the area (X1') of the corner channel 30 can be reliably suppressed.

As shown in FIG. 11, in a portion corresponding to the area (X') on the inner corner side of the L-shaped corner channel 30 (hereinafter also referred to as the area (X2')), the direction of shear deformation of the unit lattice of the shear deformation means 10 is a direction orthogonal to the direction connecting the outer corner and the inner corner. By shear deformation of the unit lattice of the shear deformation means 10, tension is applied to the area (X) on the inner corner side of the prepreg sheet 20 (hereinafter also referred to as the area (X2)), and the area (X2) of the prepreg sheet 20 is shear-deformed by extending in the same direction as the direction of shear deformation (extension direction of the reinforcing fiber base material) in the area (X2') of the corner channel 30. In a portion corresponding to the area (X2') of the corner channel 30, a crossing angle β' of the grid lines in the direction of shear deformation of the unit lattice of the shear deformation means 10 is substantially the same as the crossing angle β of reinforcing fibers in the direction of shear deformation of the area (X2') of the corner channel 30. That is, in the portion corresponding to the area (X2') of the corner channel 30, the shear angle θ' of the unit lattice of the shear deformation means 10 (the shear angle of the area (X2) of the prepreg sheet 20) is substantially the same as the shear angle θ in the area (X2') of the corner channel 30.

As a result of shear deformation of the area (X2) of the prepreg sheet 20 in advance by extending in the same direction as the direction of shear deformation (extension direction of the reinforcing fiber base material) in the area (X2') of the corner channel 30, that is, as a result of producing the prepreg sheet 20 so that the area (X2) of the prepreg sheet 20 is in the same state as a state of being shear-deformed in the same direction as the direction of shear deformation in the area (X2') of the corner channel 30, the area (X2) of the prepreg sheet 20 can more easily follow the inner corner portion of the press mold when shaping the prepreg sheet 20 by the press mold in step (II), and the occurrence of bridging in the area (X2') of the corner channel 30 can be reliably suppressed.

As a result of making the shear angle in the area (X2) of the prepreg sheet 20 substantially the same as the shear angle θ in the area (X2') of the corner channel 30, that is, as a result of producing the prepreg sheet 20 so that the area (X2) of the prepreg sheet 20 is in the same state as a state of being shear-deformed in the same direction as the direction of shear deformation in the area (X2') of the corner channel 30, the area (X2) of the prepreg sheet 20 can more easily follow the inner corner portion of the press mold when shaping the prepreg sheet 20 by the press mold in step (II), and the occurrence of bridging in the area (X2') of the corner channel 30 can be reliably suppressed.

(Step (II))

In step (II), the prepreg sheet is shaped simultaneously with step (I) or after step (I) to obtain a fiber reinforced plastic (a).

The shaping of the prepreg sheet is performed, for example, by the following method (A) or method (B).

Method (A): When shaping the prepreg sheet after step (I), the prepreg sheet is shear-deformed using the shear deformation means in step (I) and is then shaped using a press mold in step (II).

Method (B): When shaping the prepreg sheet simultaneously with step (I), the prepreg sheet is subjected to shear deformation and shaping at the same time by using one as shear deformation means that can move the fixing point in the in-plane direction of the prepreg sheet, and can move the fixing point in a direction orthogonal to the in-plane direction of the prepreg sheet.

A specific example of the method (A) will be described below by taking the L-shaped corner channel 30 shown in FIG. 5 as an example.

Figure 12:
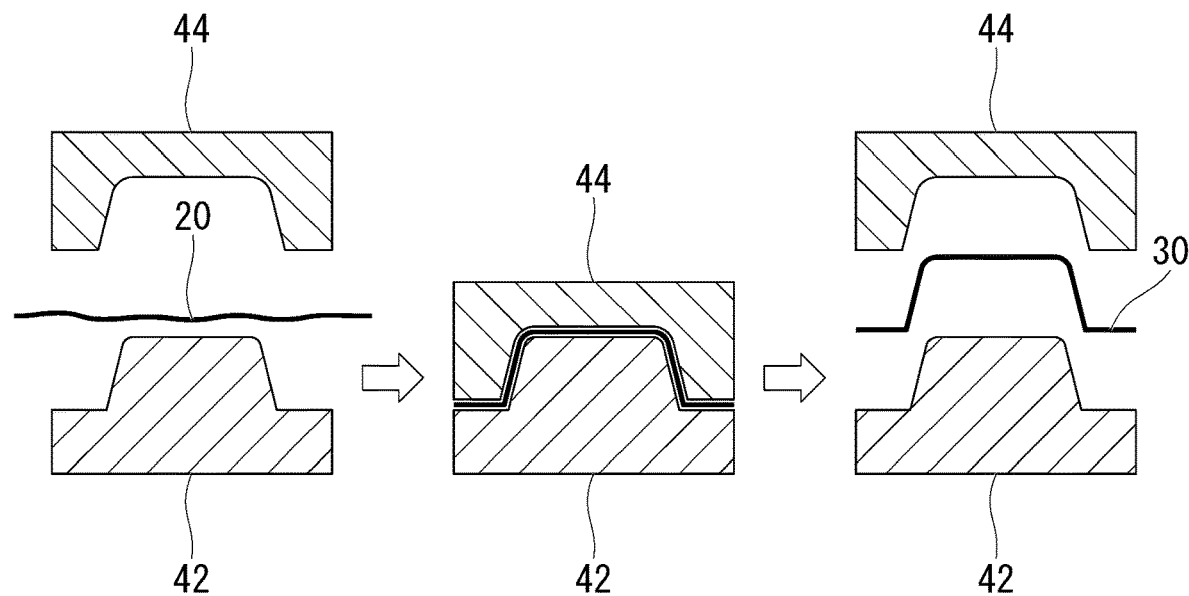
FIG. 12 is a cross-sectional view showing a state of shaping a shear-deformed prepreg sheet by a press mold.

As shown in FIG. 12, the prepreg sheet 20 removed from the shear deformation means 10 is disposed on an upper surface of a lower convex mold 42 corresponding to the L-shaped corner channel 30 so as to be in the positional relationship of the upper surface outline (broken line) of the corner channel 30 in FIG. 11 and the outline (two-dot broken line) of the prepreg sheet 20.

Here, in the case where the prepreg sheet 20 has reinforcing fibers oriented in a uniaxial direction, the uniaxial direction of the prepreg sheet 20 before shear deformation and one of the longitudinal directions of the L-shaped portion of the lower convex mold 42 are made to coincide. When the prepreg sheet 20 has reinforcing fibers oriented in two axial directions, the two axial directions of the prepreg sheet 20 before shear deformation are made to substantially coincide with the two longitudinal directions of the L-shaped portion of the lower convex mold 42.

It should be noted that in the case of laminating a plurality of prepreg sheets 20, the lamination may be conducted by making the orientations of reinforcing fibers before shear deformation to coincide with or to be orthogonal to each other, or the prepreg sheet 20 having fiber orientations of 0° and 90° and the prepreg sheet 20 having fiber orientations of ±45° may be laminated (quasi-isotropic lamination).

After heating and softening the prepreg sheet 20 by infrared rays, hot air or the like, as shown in FIG. 12, the lower convex mold 42 and an upper concave mold 44 corresponding to the L-shaped corner channel 30 are press fitted in a state of sandwiching the prepreg sheet 20 therebetween to shape the prepreg sheet 20.

It should be noted that it is also possible to use a bag film instead of the upper concave mold 44, seal the lower convex mold 42 and the prepreg sheet 20 in the bag film, and perform shaping by evacuating the inside of the bag film.

After obtaining the corner channel 30 by cooling and fixing the shaped prepreg sheet 20 by air cooling, mold heat absorption, mold cooling or the like, the corner channel 30 is removed from the lower convex mold 42 and the upper concave mold 44.

A specific example of the method (B) will be described below by taking the L-shaped corner channel 30 shown in FIG. 5 as an example.

Figure 13:
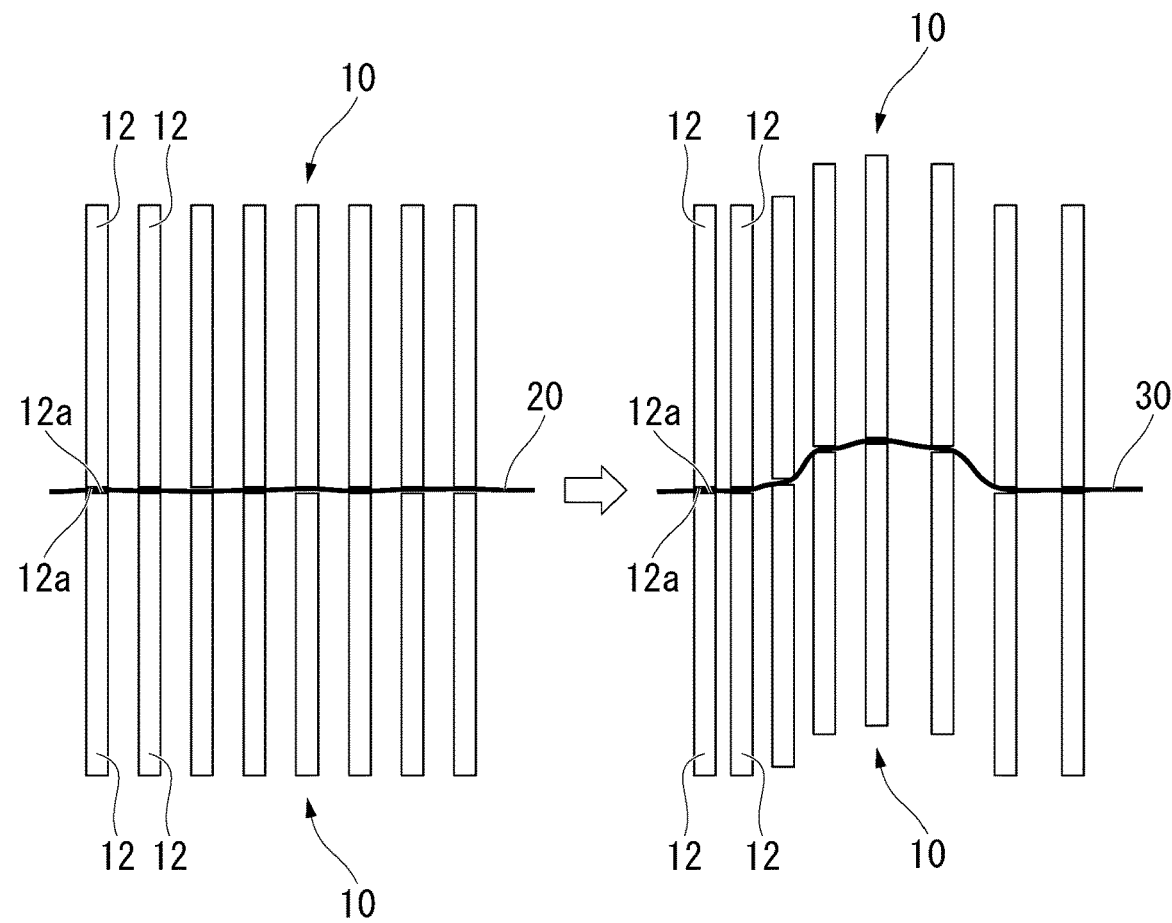
FIG. 13 is a side view showing a state in which the prepreg sheet is shear-deformed and shaped at the same time by the shear deformation means.

As shown in FIG. 13, in the upper and lower shear deformation means 10, the fixing points 12a are moved in the in-plane direction of the prepreg sheet 20 so that the unit lattice connecting the fixing points 12a located at the lattice points is shear-deformed, and at the same time, the fixed portions 12a are moved in a direction orthogonal to the in-plane direction of the prepreg sheet 20 by sliding the rods 12 in the direction orthogonal to the in-plane direction of the prepreg sheet 20. As a result, at least a part of the area (X) of the prepreg sheet 20 corresponding to the area (X') is shear-deformed by the shear deformation means 10, and at the same time, the prepreg sheet 20 is shaped into a shape of the L-shaped corner channel 30.

After obtaining the corner channel 30 by cooling and fixing the shaped prepreg sheet 20 by air cooling or the like, the corner channel 30 is removed from the shear deformation means 10.

The fiber reinforced plastic (a) obtained in step (11) may be used as it is as a final molded article or may be used as a preformed product before being processed into a final molded article. As a method of processing a preformed product into a final molded article, a method of laminating and combining a plurality of preforms in a mold as needed, and then press molding again by a process such as press molding, internal pressure molding, vacuum bag molding, autoclave molding or the like; a method of joining with other parts, and the like can be mentioned.

When the preformed product is processed into a final molded article, the shape of the lower convex mold 42 does not have to match the shape of the final molded article, but may be made into roughly the same shape and form corners during press molding.

(Mechanism of Action)

In the first aspect of the present invention described above, when the prepreg sheet is shaped into a three-dimensional shape, since at least a portion of continuous fibers in the area (X) of the prepreg sheet corresponding to the shear-deformed area (X') in the fiber reinforced plastic (a) is bent in advance in the in-plane direction of the prepreg sheet so as to be shear-deformed, when the prepreg sheet is shaped by a press mold, a shear-deformed portion of the prepreg sheet can easily follow a convex surface or concave surface of the press mold with a large curvature. Therefore, the occurrence of wrinkling and bridging in the fiber reinforced plastic (a) can be suppressed. As a result, a fiber reinforced plastic of uniform quality can be manufactured in a stable manner with high efficiency.

Further, in the first aspect of the present invention described above, since at least a part of the area (X) of the prepreg sheet is shear-deformed by the shear deformation means provided with a plurality of fixing points arranged along the in-plane direction of the prepreg sheet and capable of moving the fixing points in the in-plane direction of the prepreg sheet, tensions having different directions with each other can be simultaneously applied to different portions of the prepreg sheet. Therefore, even in the case of producing a complex three-dimensional fiber reinforced plastic having a plurality of convex surfaces and concave surfaces with large curvatures, such as L-shaped corner channels, it is possible to simultaneously suppress the occurrence of wrinkling and bridging on the convex surfaces and concave surfaces with large curvatures.

As described above, in the first aspect of the present invention, since the area (X) of the prepreg sheet corresponding to the area (X') in which the wrinkling and bridging easily occur in the fiber reinforced plastic (a) is subjected to direct shear deformation by a specific shear deformation means, within the limit of shear deformation of the prepreg sheet, it is possible to produce, not only L-shaped corner channels, but also the fiber reinforced plastic (a) of various three-dimensional shapes, such as hemispherical and box shapes, thereby making it highly versatile. Moreover, compared to the case where tension is applied to the prepreg sheet while holding the edge of the prepreg sheet as in the prior art, local damage to the edge of the prepreg sheet is less likely to occur, and there is no need to secure an extra edge portion in order to avoid damage to the edge, so that the fiber reinforced plastic (a) can be efficiently produced.

<Second Aspect of Method for Producing Fiber Reinforced Plastic>

The second aspect of the method for producing a fiber reinforced plastic of the present invention is a method for producing a fiber reinforced plastic (a) by shaping a prepreg sheet in which continuous fibers are impregnated with a resin material into a three-dimensional shape, which includes a step of using, as a prepreg sheet in which continuous fibers are impregnated with a resin material, a tow prepreg in which a resin material is impregnated into a tow obtained by bundling a plurality of reinforcing fibers, and producing a prepreg sheet by aligning a plurality of tow prepregs while bending the tow prepreg in a portion corresponding to at least a part of the area (X) of the prepreg sheet in the in-plane direction of the prepreg sheet.

For example, the second aspect of the method for producing a fiber reinforced plastic of the present invention includes the following steps ($\alpha$) to ($\beta$).

Step ($\alpha$): A step of deforming a tow prepreg corresponding to at least a part of the area (X) to produce a prepreg sheet so that at least a part of the area (X) of the prepreg sheet corresponding to the shear-deformed area (X') in the fiber reinforced plastic (a) when shaping the prepreg sheet into a three-dimensional shape is in the same state as a state of being shear-deformed.

Step ($\beta$): A step of shaping the prepreg sheet simultaneously with step ($\alpha$) or after step ($\alpha$) to obtain a fiber reinforced plastic (a).

Even when the intended fiber reinforced plastic (a) has a complicated three-dimensional shape by the above-described steps, the occurrence of wrinkling during molding, and in particular, the occurrence of bridging on the concave surface of the inner corner portion and the like can be suppressed.

(Tow)

A tow is a reinforcing fiber bundle in which a plurality of reinforcing fibers are bundled.

The number of reinforcing fibers (the number of filaments) per tow is usually from 1,000 to 60,000.

Examples of the reinforcing fibers include inorganic fibers, organic fibers, metal fibers, and composite fibers thereof.

Examples of the inorganic fibers include carbon fibers, glass fibers, graphite fibers, silicon carbide fibers, silicon nitride fibers, alumina fibers, tungsten carbide fibers, boron fibers and the like.

Examples of the organic fibers include aramid fibers, high density polyethylene fibers, nylon fibers, polyester fibers and the like.

Examples of the metal fibers include stainless steel fibers, iron fibers, titanium fibers, carbon fibers coated with a metal, and the like.

As a reinforcing fiber, a carbon fiber is preferable from the viewpoint that a lightweight, high-rigidity and high-strength fiber reinforced plastic can be obtained, and the shaping properties of a prepreg sheet or a reinforcing fiber base material is favorable.

A single type of reinforcing fiber may be used alone, or two or more types may be used in combination.

(Resin Material)

The resin material contains a resin and, if necessary, an additive.

As the resin, a thermosetting resin or a thermoplastic resin can be mentioned.

As the thermosetting resin, an epoxy resin, an unsaturated polyester resin, an acrylic resin, a vinyl ester resin, a phenol resin, a urethane resin, a benzoxazine resin and the like can be mentioned. As the thermosetting resin, an epoxy resin is preferable from the viewpoint that a high-strength fiber reinforced plastic can be obtained.

Examples of the thermoplastic resin include polyamides (nylon 6, nylon 66, and the like), polyolefins (polyethylenes, polypropylenes, and the like), modified polyolefins, polyesters (polyethylene terephthalates, polybutylene terephthalates, and the like), polycarbonates, polyamideimides, polyphenylene oxides, polysulfones, polyether sulfones, polyetheretherketones, polyetherimides, polystyrenes, acrylonitrile-butadiene-styrene copolymers, polyphenylene sulfides, liquid crystalline polyesters, acrylonitrile-styrene copolymers and the like.

As the additives, curing agents, mold releasing agents, defoaming agents, flame retardants, weather resistance improvers, antioxidants, heat stabilizers, ultraviolet absorbers, plasticizers, lubricants, colorants, compatibilizers, fillers, conductive fillers and the like can be mentioned.

(Tow Prepreg)

A tow prepreg is one in which a tow is impregnated with a resin material.

A ratio of the tow to the resin material is not particularly limited, and may be within an ordinary range.

The impregnation of the resin material into the tow may be performed by a conventional method.

(Prepreg Sheet)

The prepreg sheet in the second aspect of the present invention is one obtained by aligning a plurality of tow prepregs into a sheet form.

The prepreg sheet may be a laminated prepreg sheet in which two or more prepreg sheets are laminated.

The laminated prepreg sheet may be a lamination of a plurality of prepreg sheets of the same type of reinforcing fibers, or may be a lamination of a plurality of prepreg sheets of different types of reinforcing fibers.

(Step (α))

In step (α), a tow prepreg corresponding to at least a part of the area (X) is deformed to produce a prepreg sheet so that at least a part of the area (X) of the prepreg sheet corresponding to the shear-deformed area (X') in the fiber reinforced plastic (a) when shaping the prepreg sheet into a three-dimensional shape is in the same state as a state of being shear-deformed.

Next, a specific example of a prepreg sheet in which a tow prepreg corresponding to at least a part of the area (X) is deformed so that at least a part of the area (X) in the prepreg sheet corresponding to the area (X') is in the same state as a state of being shear-deformed will be described.

Figure 14:
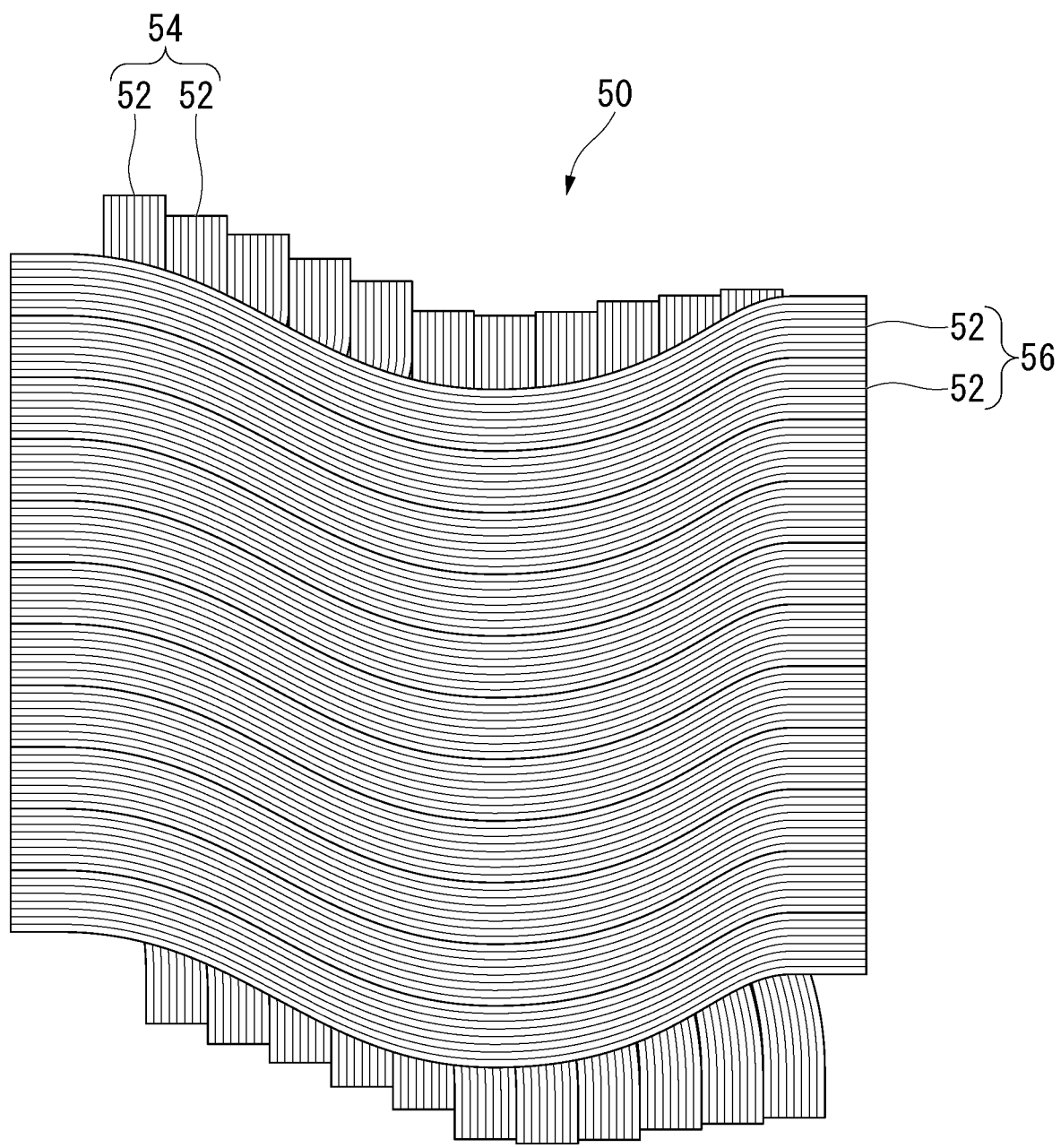
FIG. 14 is a view showing an example of a laminated prepreg sheet in which the prepreg sheets are laminated.

FIG. 14 is a view showing an example of a laminated prepreg sheet in which prepreg sheets obtained by deforming a tow prepreg corresponding to at least a part of the area (X) are laminated.

A laminated prepreg sheet 50 includes a first prepreg sheet 54 composed of a plurality of tow prepregs 52 aligned while being bent in the surface direction; and a second prepreg sheet 56 composed of a plurality of tow prepregs 52 aligned in a direction intersecting with the tow prepregs 52 of the first prepreg sheet 54 while being bent in the surface direction on the first prepreg sheet 54.

Figure 15:
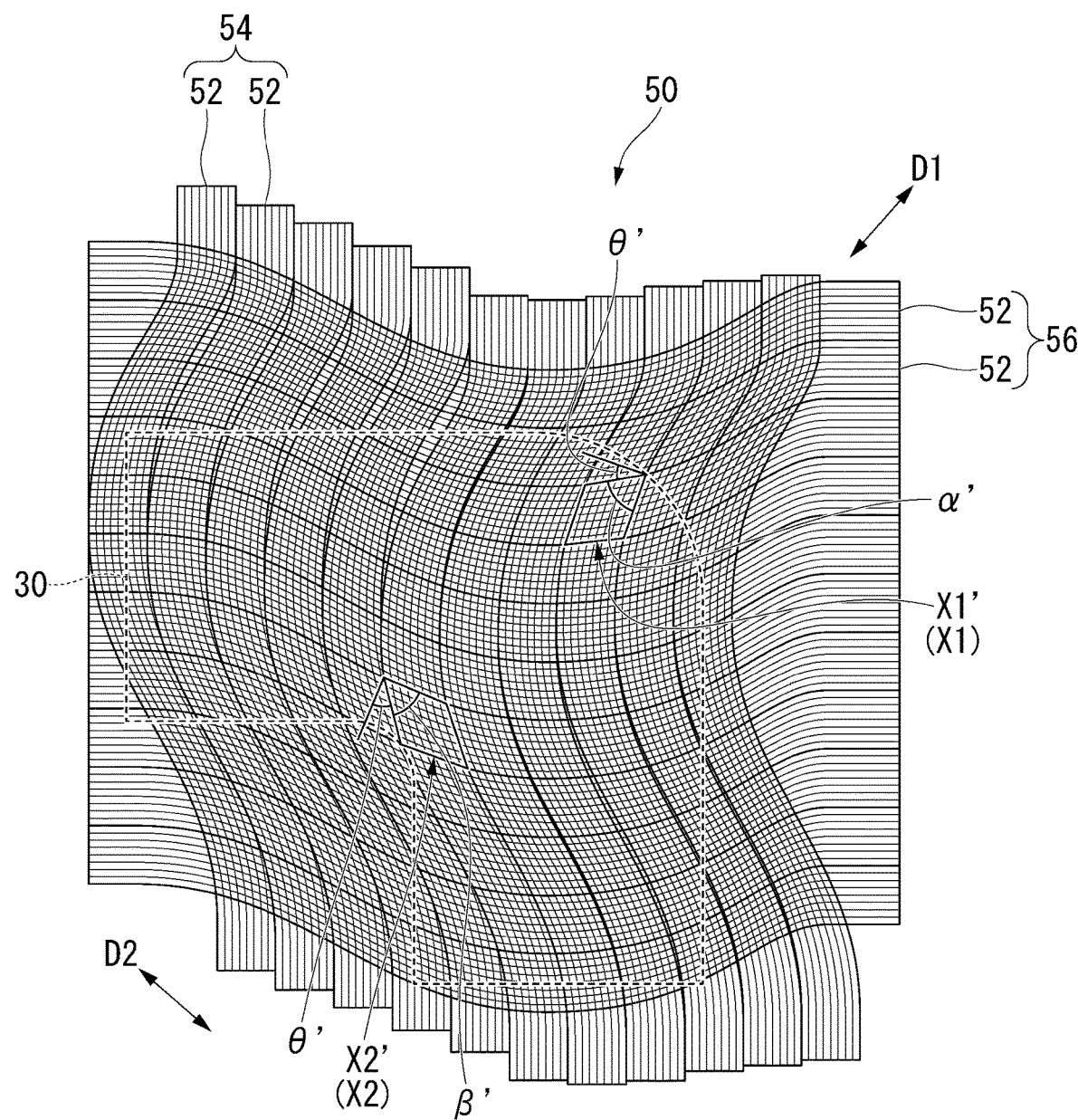
FIG. 15 is a perspective view showing a fiber placement of reinforcing fibers in the laminated prepreg sheet of FIG. 6.

FIG. 15 is a perspective view showing a fiber placement of reinforcing fibers in the laminated prepreg sheet 50 of FIG. 14.

As shown in FIG. 15, in a portion corresponding to the area (X') on the outer corner side of the L-shaped corner channel 30 (hereinafter also referred to as the area (X1')), a shear deformation direction D1 is a direction connecting the outer corner and the inner corner. In the area (X1) of the laminated prepreg sheet 50 corresponding to the area (X1'), the tow prepregs 52 are deformed so as to be in the same state as a state of being shear-deformed in the direction D1. In the area (X1), a crossing angle α' of the reinforcing fibers in the direction D1 is substantially the same as the crossing angle α of the reinforcing fibers in the direction D1 of the area (X1') of the corner channel 30. That is, in the portion corresponding to the area (X1') of the corner channel 30, a shear angle θ' (the shear angle of the area (X1) of the laminated prepreg sheet 50) is substantially the same as the shear angle θ in the area (X1') of the corner channel 30.

As a result of the area (X1) of the laminated prepreg sheet 50 being in the same state as a state of being shear-deformed in advance in the same direction D1 as the direction of shear deformation in the area (X1') of the corner channel 30, that is, as a result of producing the prepreg sheet 20 so that the area (X1) of the prepreg sheet 20 is in the same state as a state of being shear-deformed in the same direction as the direction of shear deformation in the area (X1') of the corner channel 30, the area (X1) of the laminated prepreg sheet 50 can more easily follow the outer corner portion of the press mold when shaping the laminated prepreg sheet 50 by the press mold in step (P), and the occurrence of wrinkling in the area (X1') of the corner channel 30 can be reliably suppressed.

As a result of making the shear angle θ' in the area (X1) of the laminated prepreg sheet 50 substantially the same as the shear angle θ in the area (X1') of the corner channel 30, that is, as a result of producing the prepreg sheet 20 so that the area (X1) of the prepreg sheet 20 is in the same state as a state of being shear-deformed in the same direction as the direction of shear deformation in the area (X1') of the corner channel 30, the area (X1) of the laminated prepreg sheet 50 can more easily follow the outer corner portion of the press mold when shaping the laminated prepreg sheet 50 by the press mold in step (β), and the occurrence of wrinkling in the area (X1') of the corner channel 30 can be reliably suppressed.

As shown in FIG. 15, in a portion corresponding to the area (X') on the inner corner side of the L-shaped corner channel 30 (hereinafter also referred to as area (X2')), a shear deformation direction D2 is a direction orthogonal to the direction connecting the outer corner and the inner corner. In the area (X2) of the laminated prepreg sheet 50 corresponding to the area (X2'), the tow prepregs 52 are deformed so as to be in the same state as a state of being shear-deformed in the direction D2. In the area (X2), a crossing angle β' of the reinforcing fibers in the direction D2 is substantially the same as the crossing angle β of the reinforcing fibers in the direction D2 of the area (X2') of the corner channel 30. That is, in the portion corresponding to the area (X2') of the corner channel 30, a shear angle θ' (the shear angle of the area (X2) of the laminated prepreg sheet 50) is substantially the same as the shear angle θ in the area (X2') of the corner channel 30.

As a result of the area (X2) of the laminated prepreg sheet 50 being in the same state as a state of being shear-deformed in advance in the same direction D2 as the direction of shear deformation in the area (X2') of the corner channel 30, that is, as a result of producing the prepreg sheet 20 so that the area (X2) of the prepreg sheet 20 is in the same state as a state of being shear-deformed in the same direction as the direction of shear deformation in the area (X2') of the corner channel 30, the area (X2) of the laminated prepreg sheet 50 can more easily follow the inner corner portion of the press mold when shaping the laminated prepreg sheet 50 by the press mold in step (β), and the occurrence of bridging in the area (X2') of the corner channel 30 can be reliably suppressed.

As a result of making the shear angle θ' in the area (X2) of the laminated prepreg sheet 50 substantially the same as the shear angle θ in the area (X2') of the corner channel 30, that is, as a result of producing the prepreg sheet 20 so that the area (X2) of the prepreg sheet 20 is in the same state as a state of being shear-deformed in the same direction as the direction of shear deformation in the area (X2') of the corner channel 30, the area (X2) of the laminated prepreg sheet 50 can more easily follow the inner corner portion of the press mold when shaping the laminated prepreg sheet 50 by the press mold in step (β), and the occurrence of bridging in the area (X2') of the corner channel 30 can be reliably suppressed.

As shown in FIG. 15, an area other than the area (X1') of the L-shaped corner channel 30 and the periphery thereof and the area (X2') and the periphery thereof, that is, in an area of the laminated prepreg sheet 50 corresponding to an area where the degree of shear deformation does not increase in the corner channel 30, the crossing angle between the reinforcing fibers of the first prepreg sheet 54 and the reinforcing fibers of the second prepreg sheet 56 becomes close to 90°.

It should be noted that the prepreg sheet in the present invention may be in the form of a sheet in which a plurality of tow prepregs are aligned, and is not limited to the laminated prepreg sheet 50 in the illustrated example.

For example, it may be composed of one prepreg sheet, or may be one in which three or more prepreg sheets are laminated.

Next, a method of producing a prepreg sheet by deforming a tow prepreg corresponding to at least a part of the area (X) so that at least a part of the area (X) in the prepreg sheet corresponding to the area (X') is in the same state as a state of being shear-deformed will be described.

Examples of the method for producing the prepreg sheet include a method of producing a prepreg sheet by deforming a tow prepreg corresponding to at least a part of the area (X) when aligning a plurality of tow prepregs.

The prepreg sheet may be produced in a size larger than that of the fiber reinforced plastic (a) on the premise of cutting excess portions off after shaping; or may be produced so as to have just the same size and shape of the fiber reinforced plastic (a) after shaping.

The laminated prepreg sheet 50 is produced, for example, as follows.

A plurality of tow prepregs 52 are arranged in the width direction of the tow prepreg 52 while being bent one by one in the surface direction, to form a first prepreg sheet 54. Similarly, a plurality of tow prepregs 52 are arranged in the width direction of the tow prepreg 52 on the first prepreg sheet 54 while being bent one by one in the surface direction, so that the direction of the reinforcing fibers intersects with the direction of the reinforcing fibers of the first prepreg sheet 54, to form a second prepreg sheet 56, and the laminated prepreg sheet 50 is produced.

The tow prepreg 52 is easily deformed since the reinforcing fibers are easily misaligned as compared to the cross prepreg. When the tow prepreg 52 is deformed, the tow prepreg 52 may be softened by heating with infrared rays, hot air or the like. After the tow prepregs 52 are aligned, the tow prepregs 52 are cooled and fixed by a process such as air cooling, mold heat absorption, mold cooling or the like.

As a method of deforming the tow prepreg 52 corresponding to at least a part of the area (X) in the laminated prepreg sheet 50, a method of manually bending the tow prepreg 52 when arranging the tow prepreg 52; a method of relatively moving the supply head of a tow prepreg placement device and the supply target in the surface direction to bend the tow prepreg 52, when arranging the tow prepreg 52 side by side on the supply target using a tow prepreg placement device, or the like can be mentioned.

Figure 16:
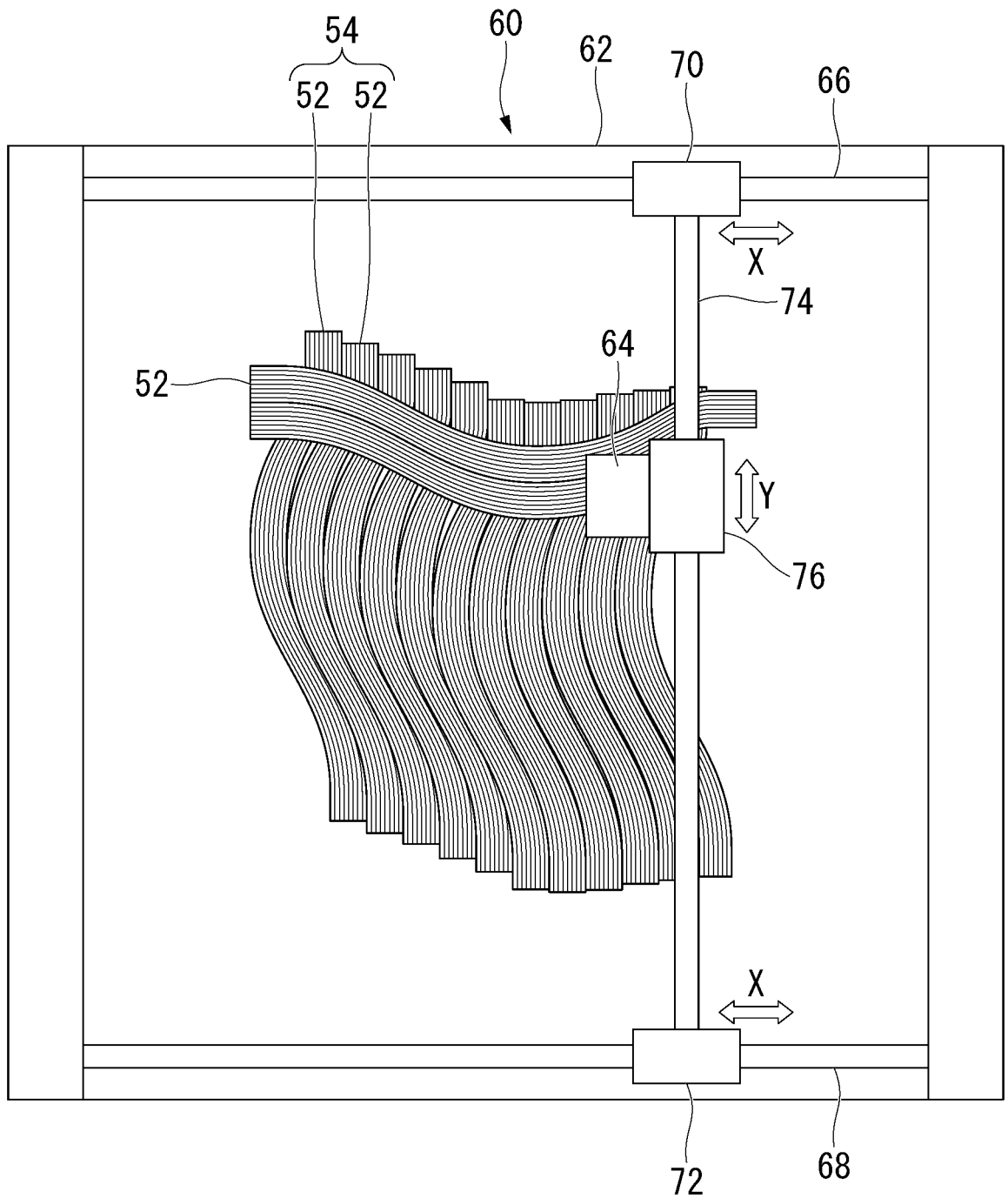
FIG. 16 is a top view showing an example of a tow prepreg placement device.

FIG. 16 is a top view showing an example of a tow prepreg placement device.

A tow prepreg placement device 60 includes: a flat base 62 (supply target) on which the tow prepreg 52 is placed; a supply head 64 for feeding the tow prepreg 52 while pressing it against the surface of the flat base 62; and a moving means for moving the supply head 64 in the surface directions (X direction and Y direction).

The moving means includes: a long first X-direction rail 66 provided on one side of the flat base 62; a long second X-direction rail 68 facing the first X-direction rail 66 and provided on one side of the flat base 62; a first X-direction moving body 70 for moving in the X-direction along the first X-direction rail 66; a second X-direction moving body 72 for moving in the X-direction along the second X-direction rail 68; a long Y-direction rail 74 bridged between the first X-direction moving body 70 and the second X-direction moving body 72; and a Y-direction moving body 76 for moving in the Y-direction along the Y-direction rail 74.

Figure 17:
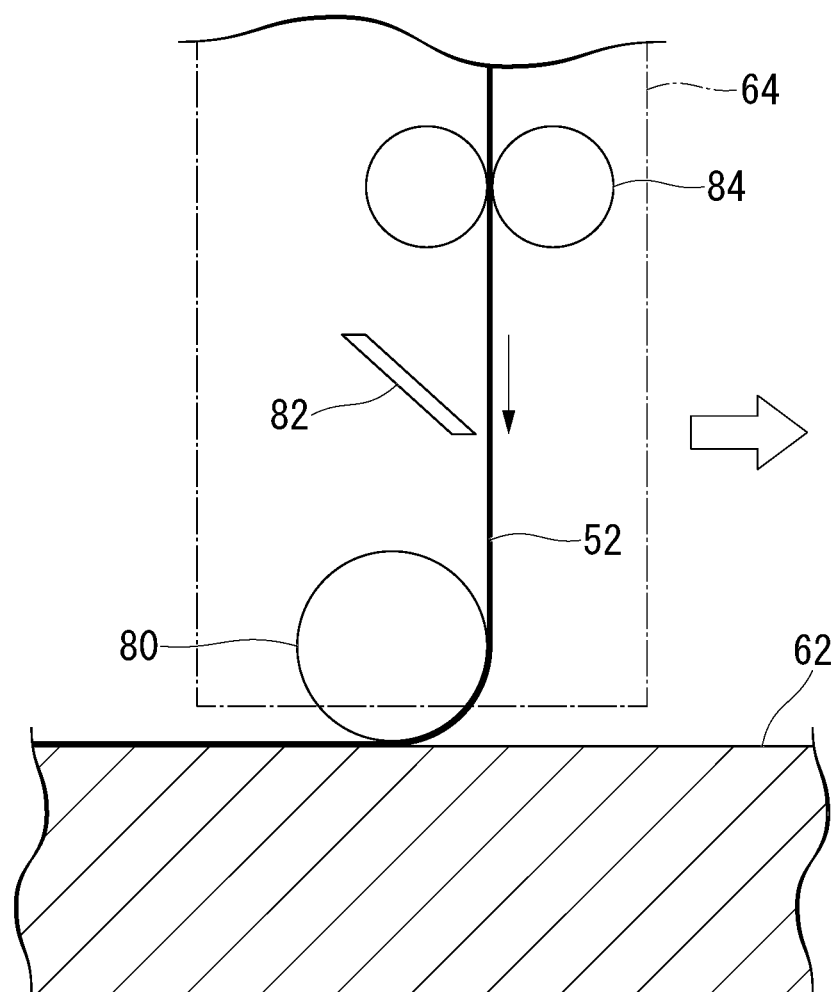
FIG. 17 is a schematic configuration view showing an example of a supply head.

FIG. 17 is a schematic configuration view showing an example of the supply head 64.

The supply head 64 includes: a pressure contact roller 80 for feeding the tow prepreg 52 while pressing it against the surface of the flat base 62; a cutter 82 for cutting the tow prepreg 52 on the upstream side of the pressure contact roller 80; and a pair of restart rollers 84 for feeding the tow prepreg 52 again after being cut by the cutter 82 toward the pressure contact roller 80.

The supply head 64 is made freely movable in the surface direction by being attached to the Y-direction moving body 76 of the moving means.

According to the tow prepreg placement device 60, since the supply head 64 which has been made freely movable in the surface direction is provided, it is possible to arrange a plurality of tow prepregs 52 in the width direction of the tow prepreg 52 while being bent one by one in the surface direction, on the flat base 62 (supply target) or the first prepreg sheet 54 (supply target) on the flat base 62.

It should be noted that the tow prepreg placement device in the present invention may be any device provided with a supply head for feeding the tow prepreg while pressing it against the supply target, and a moving means for relatively moving the supply head and the supply target, and is not limited to the tow prepreg placement device 60 in the illustrated example.

For example, it may be a tow prepreg placement device in which the supply head is fixed and the flat base is made to be freely movable in the surface direction. Further, it may be a tow prepreg placement device in which a supply head is attached to the tip of an articulated robot (so-called robot arm) described later.

(Step (β))

In step (β), the prepreg sheet is shaped simultaneously with step (α) or after step (α) to obtain a fiber reinforced plastic (a).

The shaping of the prepreg sheet is performed, for example, by the following method (A) or the following method (B).

Method (A): When shaping a prepreg sheet after step (α), after the prepreg sheet is produced, the prepreg sheet is shaped using a press mold in step (β).

Method (B): When shaping a prepreg sheet simultaneously with step (α), the prepreg sheet is produced while being shaped into a three-dimensional shape by aligning a plurality of tow prepregs on a mold having the same shape as that of the fiber reinforced plastic (a).

A specific example of the method (A) will be described below by taking the L-shaped corner channel 30 shown in FIG. 5 as an example.

Figure 18:
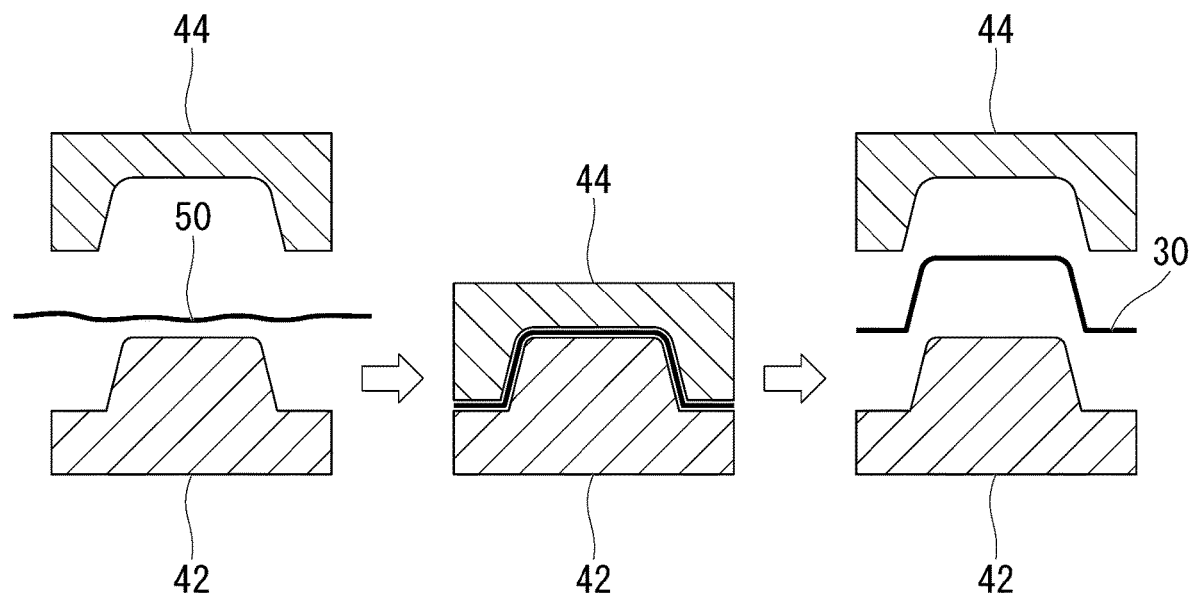
FIG. 18 is a cross-sectional view showing a state of shaping a laminated prepreg sheet by a press mold.

As shown in FIG. 18, the laminated prepreg sheet 50 in the same state as a state where at least a part of the area (X) in the laminated prepreg sheet 50 corresponding to the area (X') is shear-deformed is disposed on the upper surface of the lower convex mold 42 corresponding to the L-shaped corner channel 30 so as to be in the positional relationship of the upper surface outline (broken line) of the corner channel 30 in FIG. 15 and the laminated prepreg sheet 50.

At this time, the two axial directions of the reinforcing fibers of the non-deformed portion of the laminated prepreg sheet 50 are made to substantially coincide with the two longitudinal directions of the L-shaped portion of the lower convex mold 42.

It should be noted that in the case of laminating a plurality of prepreg sheets on the upper surface of the lower convex mold 42, the lamination may be conducted by making the orientations of the reinforcing fibers of the non-deformed portion of the prepreg sheet to coincide with or to be orthogonal to each other, or a laminated prepreg sheet having fiber orientations of 0° and 90° and a laminated prepreg sheet having fiber orientations of ±45° may be laminated (quasi-isotropic lamination).

After heating and softening the laminated prepreg sheet 50 by infrared rays, hot air or the like, as shown in FIG. 18, the lower convex mold 42 and the upper concave mold 44 corresponding to the L-shaped corner channel 30 are press fitted in a state of sandwiching the laminated prepreg sheet 50 therebetween to shape the laminated prepreg sheet 50.

It should be noted that it is also possible to use a bag film instead of the upper concave mold 44, seal the lower convex mold 42 and the laminated prepreg sheet 50 in the bag film, and perform shaping by evacuating the inside of the bag film.

After obtaining the corner channel 30 by cooling and fixing the shaped laminated prepreg sheet 50 by air cooling, mold heat absorption, mold cooling or the like, the corner channel 30 is removed from the lower convex mold 42 and the upper concave mold 44.

A specific example of the method (B) will be described below by taking the L-shaped corner channel 30 shown in FIG. 5 as an example.

Figure 19:
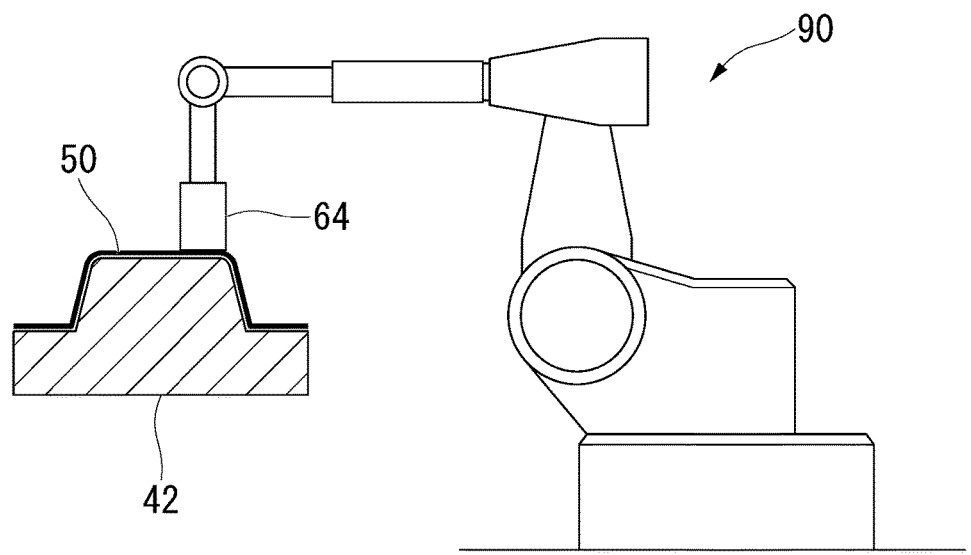
FIG. 19 is a schematic configuration view showing another example of the tow prepreg placement device.

As shown in FIG. 19, using a tow prepreg placement device in which the supply head 64 is attached to the tip of an articulated robot 90 (so-called robot arm), on the upper surface of the lower convex mold 42 corresponding to the L-shaped corner channel 30, a plurality of tow prepregs 52 are arranged in the width direction of the tow prepreg 52 while being bent one by one in the surface direction of the upper surface of the lower convex mold 42, to form a first prepreg sheet 54. Similarly, a plurality of tow prepregs 52 are arranged in the width direction of the tow prepreg 52 on the first prepreg sheet 54 while being bent one by one in the surface direction, so that the direction of the reinforcing fibers intersects with the direction of the reinforcing fibers of the first prepreg sheet 54, to form a second prepreg sheet 56.

At this time, the tow prepreg 52 corresponding to at least a part of the area (X) is deformed so that at least a part of the area (X) in the laminated prepreg sheet 50 corresponding to the area (X') is in the same state as a state of being shear-deformed. Further, when the tow prepreg 52 is deformed, the tow prepreg 52 may be softened by heating with infrared rays, hot air or the like.

In this manner, the laminated prepreg sheet 50 is produced while being shaped. After obtaining the corner channel 30 by cooling and fixing the shaped laminated prepreg sheet 50 by air cooling, mold heat absorption, mold cooling or the like, the corner channel 30 is removed from the lower convex mold 42.

The fiber reinforced plastic (a) obtained in step (β) may be used as it is as a final molded article or may be used as a preformed product before being processed into a final molded article. As a method of processing a preformed product into a final molded article, a method of laminating and combining a plurality of preformed products in a mold as needed, and then press molding again by a process such as press molding, internal pressure molding, vacuum bag molding, autoclave molding or the like; a method of joining with other parts, and the like can be mentioned.

When the preformed product is processed into a final molded article, the shape of the lower convex mold 42 does not have to match the shape of the final molded article, but may be made into roughly the same shape and form corners during press molding.

(Mechanism of Action)

In the second aspect of the present invention described above, when the prepreg sheet is shaped into a three-dimensional shape, since at least a portion of continuous fibers in the area (X) of the prepreg sheet corresponding to the shear-deformed area (X') in the fiber reinforced plastic (a) is in the same state as a state of being shear-deformed, when the prepreg sheet is shaped by a press mold, it becomes easy for a portion of the prepreg sheet which has been deformed in advance to follow a convex surface or concave surface of the press mold with a large curvature. Therefore, the occurrence of wrinkling and bridging in the fiber reinforced plastic (a) can be suppressed. As a result, a fiber reinforced plastic of uniform quality can be manufactured in a stable manner with high efficiency.

Further, in the second aspect of the present invention described above, since the prepreg sheet is formed by aligning a plurality of tow prepregs, each tow prepreg can be individually deformed. Therefore, in different parts of the prepreg sheet, deformation can be arbitrarily applied so as to be in the same state as a state of being shear-deformed in directions different from each other. Therefore, even in the case of producing a complex three-dimensional fiber reinforced plastic having a plurality of convex surfaces and concave surfaces with large curvatures, such as L-shaped corner channels, it is possible to simultaneously suppress the occurrence of wrinkling and bridging on the convex surfaces and concave surfaces with large curvatures.

As described above, in the second aspect of the present invention, since the area (X) of the prepreg sheet corresponding to the area (X') in which the wrinkling and bridging easily occur in the fiber reinforced plastic (a) is directly deformed, as long as the tow prepreg can be deformed (bent) in the in-plane direction of the prepreg sheet, it is possible to produce, not only L-shaped corner channels, but also the fiber reinforced plastic (a) of various three-dimensional shapes, such as hemispherical and box shapes, thereby making it highly versatile. Moreover, compared to the case where tension is applied to the prepreg while holding the edge of the prepreg as in the prior art, local damage to the edge of the prepreg is less likely to occur, and there is no need to secure an extra edge portion in order to avoid damage to the edge, so that the fiber reinforced plastic (a) can be efficiently produced, including the minimization of scraps.

<Third Aspect of Method for Producing Fiber Reinforced Plastic>

A third aspect of the method for producing a fiber reinforced plastic of the present invention (hereinafter, also simply referred to as the "third aspect of the present invention") is a method for producing a three-dimensional fiber reinforced plastic (a) by obtaining a three-dimensional preform (b) by shaping a reinforcing fiber base material into a three-dimensional shape, and impregnating and solidifying the preform (b) with a resin material, which is characterized in that at least a part of the area (Y) of the reinforcing fiber base material corresponding to the area (Y') in which this preform (b) is shear-deformed is bent in the in-plane direction in advance.

Here, as a method of determining the shear-deformed area (Y'), the aforementioned method of determining the shear-deformed area (X') can be employed.

Further, in the third aspect of the present invention, it is preferable to produce the reinforcing fiber base material so that at least a part of the area (Y) of the reinforcing fiber base material is in the same state as a state of being shear-deformed in the same direction as the direction of shear deformation in the shear-deformed area (Y') in the preform (b).

For example, the third aspect of the method for producing a fiber reinforced plastic of the present invention includes the following steps (i) to (iii).

Step (i): a step of shear-deforming at least a part of the area (Y) of the reinforcing fiber base material corresponding to the area (Y') where the degree of shear deformation increases in the preform (b) when shaping the reinforcing fiber base material into a three-dimensional shape by a specific shear deformation means.

Step (ii): a step of shaping the reinforcing fiber base material simultaneously with step (i) or after step (ii) to obtain a preform (b).

Step (iii): a step of impregnating the preform (b) with a resin material and solidifying the resultant to obtain a fiber reinforced plastic (a).

Even when the intended fiber reinforced plastic (a) has a complicated three-dimensional shape by the above-described steps, the occurrence of wrinkling during molding, and in particular, the occurrence of bridging on the concave surface of the inner corner portion and the like can be suppressed.

In the third aspect of the method for producing a fiber reinforced plastic of the present invention, a specific shear deformation means can be used as a shear deformation means for shear deformation of the reinforcing fiber base material.

As the shear deformation means that can be used in the third aspect of the method for producing a fiber reinforced plastic of the present invention, the shear deformation means described in the first aspect of the method for producing a fiber reinforced plastic of the present invention can be used.

The reinforcing fiber base material may be those obtained by laminating a plurality of reinforcing fiber base materials. In the case where a plurality of reinforcing fiber base materials are laminated in such a manner that the orientations of the reinforcing fibers are made to coincide with or to be orthogonal to each other, in the third aspect of the method for producing a fiber reinforced plastic of the present invention, they may be laminated before step (i), may be laminated between step (i) and step (ii) or may be laminated between step (ii) and step (iii). In the case of the so-called quasi-isotropic lamination in which a reinforcing fiber base material having fiber orientations of 0° and 90° and a reinforcing fiber base material having fiber orientations of ±45° are laminated, in the second aspect, they are laminated between step (i) and step (ii) or between step (ii) and step (iii).

(Step (i))

In step (i), at least a part of the area (Y) of the reinforcing fiber base material corresponding to the shear-deformed area (Y') in the preform (b) when shaping the reinforcing fiber base material into a three-dimensional shape is shear-deformed by a specific shear deformation means.

As a method of determining the area (Y'), the method of determining the area (X') described in the first aspect of the present invention and the second aspect of the present invention can be employed. More specifically, the area (Y') can be determined in the same manner as in the first aspect of the present invention and the second aspect of the present invention by replacing the prepreg sheet in the first aspect of the present invention and the second aspect of the present invention with a reinforcing fiber base material, and the fiber reinforced plastic in the first aspect of the present invention and the second aspect of the present invention with a preform. The preferred form in the determination of the area (Y') according to the third aspect of the present invention is the same as the preferred form in the determination of the area (X') according to the first aspect of the present invention and the second aspect of the present invention.

Further, with respect to shear deformation of the reinforcing fiber base material by the shear deformation means, shear deformation of the reinforcing fiber base material can be performed in the same manner as in the first aspect of the present invention and the second aspect of the present invention by replacing the prepreg sheet in the first aspect of the present invention and the second aspect of the present invention with a reinforcing fiber base material, and the fiber reinforced plastic in the first aspect of the present invention and the second aspect of the present invention with a preform. The preferred form in the shear deformation of the reinforcing fiber base material according to the third aspect of the present invention is the same as the preferred form in the shear deformation of the prepreg sheet according to the first aspect of the present invention and the second aspect of the present invention.

(Step (ii))

In step (ii), the reinforcing fiber base material is shaped simultaneously with step (i) or after step (i) to obtain a preform (b).

The reinforcing fiber base material can be shaped in the same manner as in the first aspect of the present invention and the second aspect of the present invention by replacing the prepreg sheet in the first aspect of the present invention and the second aspect of the present invention with a reinforcing fiber base material, and the fiber reinforced plastic in the first aspect of the present invention and the second aspect of the present invention with a preform. The preferred form in the shaping of the reinforcing fiber base material according to the third aspect of the present invention is the same as the preferred form in the shaping of the prepreg sheet according to the first aspect of the present invention and the second aspect of the present invention.

(Step (iii))

In step (iii), the preform (b) is impregnated with a resin material and solidified to obtain a fiber reinforced plastic.

The impregnation of the resin material into the preform (b) and solidification of the resultant may be performed in the same manner as in the known RTM method, and, for example, a method of placing the preform (b) in a mold, injecting the resin material into the mold, impregnating the resin material into the reform (b), and then solidifying the resin material can be employed.

In the case of laminating a plurality of preforms (b) before or after impregnating the preforms (b) with the resin material, they may be laminated by making the orientations of the reinforcing fibers to coincide with or to be orthogonal to each other, or preforms (b) having fiber orientations of 0° and 90° and preforms (b) having fiber orientations of ±45° may be laminated (quasi-isotropic lamination).

The fiber reinforced plastic (a) obtained in step (iii) may be used as it is as a final molded article or may be used as a preformed product before being processed into a final molded article. As a method of processing a preformed product into a final molded article, a method of laminating and combining a plurality of preformed products in a mold as needed, and then press molding again by a process such as press molding, internal pressure molding, vacuum bag molding, autoclave molding or the like; a method of joining with other parts, and the like can be mentioned.

When the preformed product is processed into a final molded article, the shape of the lower convex mold 42 does not have to match the shape of the final molded article, but may be made into roughly the same shape and form corners during press molding.

(Mechanism of Action)

In the third aspect of the present invention described above, due to the same action mechanism as in the first aspect of the present invention, it is possible to simultaneously suppress the occurrence of wrinkling and bridging on the convex surfaces and concave surfaces with large curvatures even when producing a fiber reinforced plastic having a complex three-dimensional shape.

EXAMPLES

Hereinafter, the present invention will be specifically described by way of examples, but the present invention is not limited thereto.

As a shear deformation means, a shear deformation means 10 (link array) shown in FIG. 1 was prepared. The number of rods 12 was 7×7=49, and a center-to-center distance of the rods 12 was 25 mm.

A prepreg was prepared by cutting a carbon fiber reinforced epoxy resin prepreg (TR3110 360 GMP, obtained by impregnating a carbon fiber base material made of plain weave fabric with an epoxy resin, manufactured by Mitsubishi Chemical Corporation) into 20 cm squares, and laminating two plies so that fiber orientations were made to coincide.

A tow prepreg was prepared by cutting a uniaxial prepreg in which a carbon fiber tow (the number of filaments: 24,000) was impregnated with an epoxy resin into a length of 20 cm and a width of 6 mm.

Example 1

For the L-shaped corner channel 30 shown in FIG. 5, a shear angle distribution based on the fiber placement of the carbon fiber base material was determined by simulation software (Fibersim (registered trademark) manufactured by Siemens PLM Software). The shear angle distribution is shown in FIG. 6 and FIG. 7. An area C in which the shear angle θ in the shear angle distribution was 30° or more was taken as a shear-deformed area (X').

As shown on the left side of FIG. 10, a laminated prepreg 20 was placed on the fixing point 12a of the shear deformation means 10 so that the fiber orientation of the reinforcing fiber base material in the prepreg 20 coincided with the grid line (direction of the link 14) of the tetragonal lattice of the shear deformation means 10.

As shown on the left side of FIG. 10, another shear deformation means 10 was further disposed on the prepreg 20, and the fixing points 12a of the respective rods 12 in the upper and lower shear deformation means 10 are aligned so as to butt against each other through the prepreg 20, and the prepregs 20 were held by being sandwiched by the respective rods 12 from above and below.

The prepreg 20 was softened by heating with infrared rays. As shown in FIGS. 10 and 11, each area (X) of the prepreg 20 was extended and shear-deformed by shear deformation of the unit lattice of the shear deformation means 10 corresponding to the two areas (X'), so that the area (X) of the prepregs 20 corresponding to each of the area (X1') on the outer corner side and the area (X2') on the inner corner side in which wrinkling and bridging easily occur in the corner channel 30 is shear-deformed, in such a manner so as to be in the same direction as the direction of shear deformation in each area (X') (extension direction of the reinforcing fiber base material), and to have a shear angle θ' substantially the same as the shear angle θ in each area (X'). The shear-deformed prepreg 20 was cooled by air cooling and fixed.

The prepreg 20 removed from the shear deformation means 10 was placed on the upper surface of the lower convex mold 42 corresponding to the L-shaped corner channel 30, as shown in FIG. 12, so as to be in the positional relationship of the upper surface outline (broken line) of the corner channel 30 in FIG. 11 and the outline (two-dot broken line) of the prepreg 20.

After the prepreg 20 was heated by infrared rays and softened to such an extent that the shear deformation did not return, as shown in FIG. 12, the lower convex mold 42 and the upper concave mold 44 corresponding to the L-shaped corner channel 30 were press fitted in a state of sandwiching the prepreg 20 therebetween to shape the prepreg 20. After obtaining the corner channel 30 by cooling and fixing the shaped prepreg 20, the corner channel 30 was removed from the lower convex mold 42 and the upper concave mold 44.

The obtained corner channel 30 was in a satisfactory state without any occurrence of wrinkling or bridging in the outer corner portion or the inner corner portion with a large curvature.

Comparative Example 1

Two places at the edge of the prepreg laminated in the same manner as in Example 1 were held with a clamp so that tension was applied in the same direction as the direction of shear deformation (extension direction of the reinforcing fiber base material) in the area (X1') to the area (X) of the prepreg corresponding to each of the area (X1') on the outer corner side and the area (X2') on the inner corner side.

The prepreg was softened by heating with infrared rays. By pulling the clamp outward of the prepreg, the two areas (X) of the prepreg were extended and shear-deformed in the same direction as the direction of shear deformation in the area (X1') (extension direction of the reinforcing fiber base material). The shear-deformed prepreg was cooled by air cooling and fixed.

The shear-deformed prepreg 20 was shaped in the same manner as in Example 1 to obtain a corner channel.

In the obtained corner channel, no wrinkling occurred in the outer corner portion, but the bridging occurred in the inner corner portion.

Example 2

For the L-shaped corner channel 30 shown in FIG. 5, a shear angle distribution based on the fiber placement of the carbon fibers was determined by simulation software (Fibersim (registered trademark) manufactured by Siemens PLM Software). The shear angle distribution is shown in FIG. 6 and FIG. 7. An area C in which the shear angle θ in the shear angle distribution was 30° or more was taken as a shear-deformed area (X').

A tow prepreg 52 was softened by heating with infrared rays. As shown in FIG. 15, a plurality of tow prepregs 52 were arranged in order in the width direction of the tow prepregs 52 while being bent one by one in the surface direction to produce a first prepreg sheet 54 in such a manner that in the corner channel 30, the area (X) in the laminated prepreg sheet 50 corresponding to each of the area (X1') on the outer corner side and the area (X2') on the inner corner side in which wrinkling and bridging easily occur was in a deformed state corresponding to the shear deformation of the two areas (X') (that is, in such a manner so as to be in the same state as a state of being shear-deformed in the same direction as the direction of shear deformation in each area (X'), and to have a shear angle θ' substantially the same as the shear angle θ in each area (X')). Similarly, a plurality of tow prepregs 52 were arranged in the width direction of the tow prepreg 52 on the first prepreg sheet 54 while being bent one by one in the surface direction, so that the direction of the reinforcing fibers intersected with the direction of the reinforcing fibers of the first prepreg sheet 54, to form a second prepreg sheet 56, and a laminated prepreg sheet 50 was produced. The laminated prepreg sheet 50 was cooled by air cooling and fixed.

As shown in FIG. 18, the laminated prepreg sheet 50 was arranged on the upper surface of the lower convex mold 42 corresponding to the L-shaped corner channel 30 so as to be in the positional relationship of the upper surface outline (broken line) of the corner channel 30 in FIG. 15 and the laminated prepreg sheet 50.

After the laminated prepreg sheet 50 was heated by infrared rays and softened to such an extent that the deformation of the tow prepreg 52 did not return, as shown in FIG. 18, the lower convex mold 42 and the upper concave mold 44 corresponding to the L-shaped corner channel 30 were press fitted in a state of sandwiching the laminated prepreg sheet 50 therebetween to shape the laminated prepreg sheet 50. After obtaining the corner channel 30 by cooling and fixing the shaped laminated prepreg sheet 50, the corner channel 30 was removed from the lower convex mold 42 and the upper concave mold 44.

The obtained corner channel 30 was in a satisfactory state without any occurrence of wrinkling or bridging in the outer corner portion or the inner corner portion with a large curvature.

Comparative Example 2

A plurality of tow prepregs were arranged in the width direction of the tow prepreg without being bent in the surface direction, to form a first prepreg sheet. Similarly, a plurality of tow prepregs were arranged in the width direction of the tow prepreg on the first prepreg sheet without being bent in the surface direction, so that the direction of the reinforcing fibers was orthogonal to the direction of the reinforcing fibers of the first prepreg sheet, to form a second prepreg sheet, and a laminated prepreg sheet was produced. The laminated prepreg sheet was cooled by air cooling and fixed.

Two places at the edge of the laminated prepreg sheet were held with a clamp so that tension was applied in the same direction as the direction of shear deformation in the area (X1') to the area (X) of the prepreg corresponding to each of the area (X1') on the outer corner side and the area (X2') on the inner corner side.

The laminated prepreg sheet was softened by heating with infrared rays. By pulling the clamp outward of the laminated prepreg sheet, the two areas (X) of the laminated prepreg sheet were extended and shear-deformed in the same direction as the direction of shear deformation in the area (X1'). The shear-deformed prepreg was cooled by air cooling and fixed.

The shear-deformed laminated prepreg sheet was shaped in the same manner as in Example 2 to obtain a corner channel.

In the obtained corner channel, no wrinkling occurred in the outer corner portion, but the bridging, in addition to the mesh opening and mesh disturbance of the carbon fiber occurred in the inner corner portion.

INDUSTRIAL APPLICABILITY

The method for producing a fiber reinforced plastic of the present invention is useful as a method for producing a complex three-dimensional fiber reinforced plastic.

REFERENCE SIGNS LIST

10: Shear deformation means; 12: Rod; 12a: Fixing point; 14: Link; 16: Plate-like portion; 16a: Through hole; 18: Connecting portion; 20: Prepreg sheet; 30: Corner channel; 32: Square shape; 34: Rhombus shape; 36: Fiber orientation; 42: Lower convex mold; 44: Upper concave mold; 50: Laminated prepreg sheet; 52: Tow prepreg; 54: First prepreg sheet; 56: Second prepreg sheet; 60: Tow prepreg placement device; 62: Flat base; 64: Supply head; 66: First X-direction rail; 68: Second X-direction rail; 70: First X-direction moving body; 72: Second X-direction moving body; 74: Y-direction rail; 76: Y-direction moving body; 80: Pressure contact roller; 82: Cutter; 84: Restart roller; 90: Articulated robot.

The invention claimed is:

1. A method for producing a fiber reinforced plastic, the method comprising:
    shaping a prepreg sheet in which continuous fibers are impregnated with a resin material into a three-dimensional shape to produce the fiber reinforced plastic (a), wherein at least a portion of the continuous fibers in an area (X) of the prepreg sheet corresponding to an area (X') in which the fiber reinforced plastic (a) is shear-deformed is bent in an in-plane direction in advance; and
    producing the prepreg sheet such that at least a part of the area (X) is in the same state as a state of being shear-deformed in the same direction as a direction of shear deformation in the area (X'), and
    shear-deforming at least a part of the area (X) by a shear deformer having a plurality of fixing points that fix the prepreg sheet and are arranged along the in-plane direction of the prepreg sheet, and capable of moving the fixing points in the in-plane direction of the prepreg sheet; and
    shaping the prepreg sheet simultaneously with shear deformation of the prepreg sheet or after shear deformation of the prepreg sheet, and
    wherein the shear deformer comprises the plurality of fixing points that fix the prepreg sheet and are arranged along the in-plane direction of the prepreg sheet so as to be positioned at lattice points of a tetragonal lattice, and capable of moving the fixing points in the in-plane direction of the prepreg sheet so that a unit lattice connecting the fixing points is shear-deformed.

2. The method of claim 1, wherein, when a shear angle distribution is determined based on a fiber placement of continuous fibers in a fiber reinforced plastic of the same shape as that of the fiber reinforced plastic (a) by simulation software capable of determining a fiber placement of continuous fibers in a three-dimensional fiber reinforced plastic, the area (X') is an area in which a shear angle is 5° or more in the shear angle distribution.

3. The method of claim 1, wherein the continuous fibers are bent in an in-plane direction of the prepreg sheet by fixing the prepreg sheet at the plurality of fixing points arranged along the in-plane direction of the prepreg sheet, and moving at least a portion of the plurality of fixing points in the in-plane direction of the prepreg sheet.

4. The method of claim 1,
wherein the shaping the prepreg sheet is after shear deformation of the prepreg sheet.

5. The method of claim 1, wherein the shear deformer is capable of moving the fixing points in the in-plane direction of the prepreg sheet, and capable of moving the fixing points in a direction orthogonal to the in-plane direction of the prepreg sheet.

6. The method of claim 1, further comprising:
shaping the prepreg sheet using a press mold after producing the prepreg sheet.

7. The method of claim 1, wherein the prepreg sheet is a laminated prepreg sheet in which two or more of the prepreg sheets are laminated.

8. A method for producing a fiber reinforced plastic, the method comprising:
shaping a reinforcing fiber base material into a three-dimensional shape to obtain a preform (b);
impregnating the preform (b) with a resin material;
solidifying the preform (b) impregnated with a resin material to produce the fiber reinforced plastic (a);
producing the reinforcing fiber base material so that at least a part of an area (Y) is in the same state as a state of being shear-deformed in the same direction as a direction of shear deformation in an area (Y')
wherein at least a part of the area (Y) of the reinforcing fiber base material corresponding to the area (Y') in which the preform (b) is shear-deformed is bent in the in-plane direction in advance, and
shear-deforming at least a part of the area (Y) by a shear deformer having a plurality of fixing points that fix the reinforcing fiber base material and are arranged along the in-plane direction of the reinforcing fiber base material, and capable of moving the fixing points in the in-plane direction of the reinforcing fiber base material; and shaping the reinforcing fiber base material simultaneously with shear deformation of the reinforcing fiber base material or after shear deformation of the reinforcing fiber base material, and
wherein the shear deformer comprises the plurality of fixing points that fix the reinforcing fiber base material and are arranged along the in-plane direction of the reinforcing fiber base material so as to be positioned at lattice points of a tetragonal lattice, and capable of moving the fixing points in the in-plane direction of the reinforcing fiber base material so that a unit lattice connecting the fixing points is shear-deformed.

9. The method of claim 8, wherein when a shear angle distribution is determined based on a fiber placement of the reinforcing fiber base material in a preform of the same shape as that of the preform (b) by simulation software capable of determining a fiber placement of a reinforcing fiber base material in a three-dimensional preform, the area (Y') is an area in which a shear angle is 5° or more in the shear angle distribution.

10. The method of claim 8, wherein the reinforcing fiber base material is bent in the in-plane direction of the reinforcing fiber base material by fixing the reinforcing fiber base material at the plurality of fixing points arranged along the in-plane direction of the reinforcing fiber base material, and moving at least a portion of the plurality of fixing points in the in-plane direction of the reinforcing fiber base material.

11. The method of claim 8,
wherein the shaping said reinforcing fiber base material is after shear deformation of the reinforcing fiber base material.

12. The method of claim 8, wherein the shear deformer is capable of moving the fixing points in the in-plane direction of the reinforcing fiber base material, and capable of moving the fixing points in a direction orthogonal to the in-plane direction of the reinforcing fiber base material.

* * * * *